Figure 1:
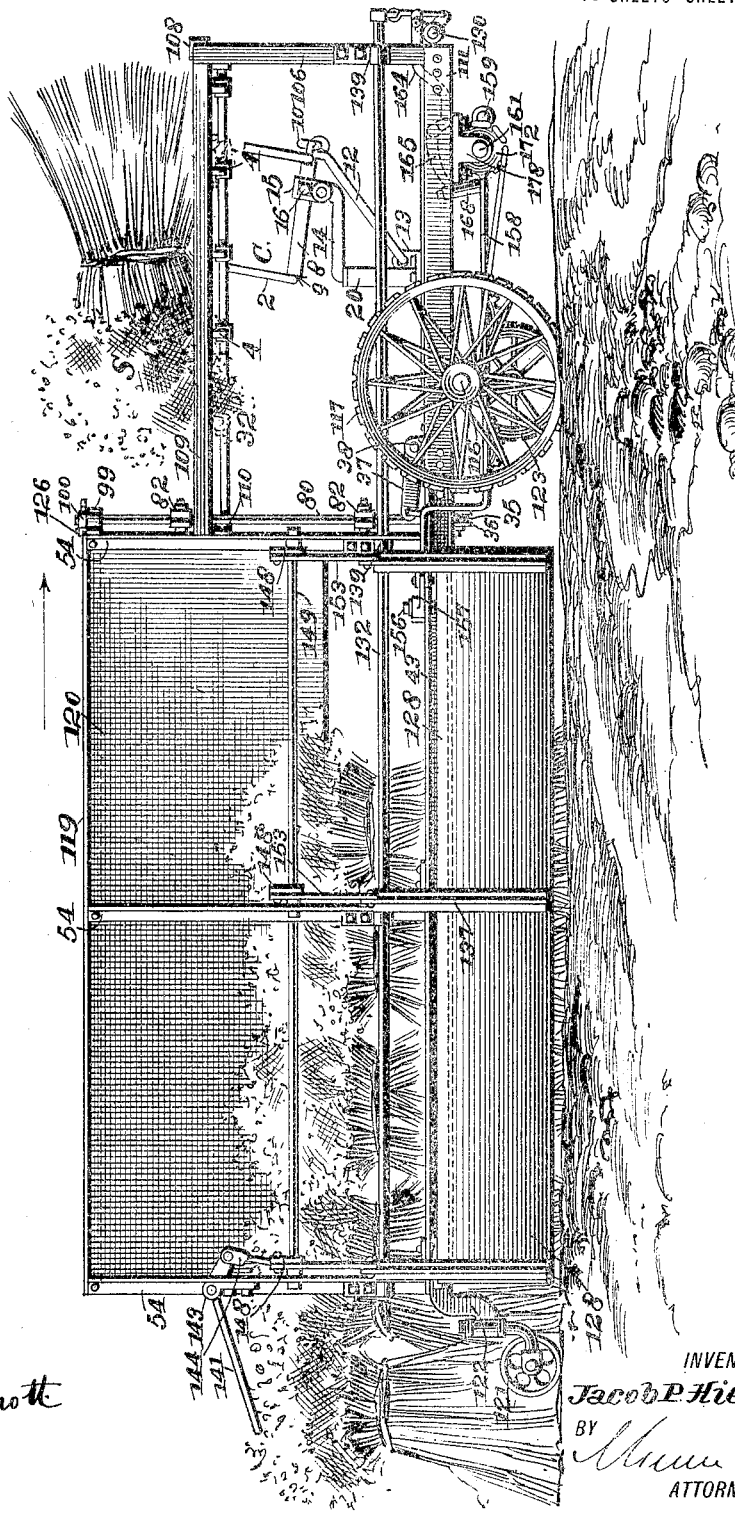

J. P. HIEBERT.
GRAIN SHEAF SHOCKER.
APPLICATION FILED AUG. 7, 1919.

1,373,727.

Patented Apr. 5, 1921.
13 SHEETS—SHEET 1.

WITNESSES
J. P. Schrott

INVENTOR
Jacob P. Hiebert
BY
ATTORNEYS

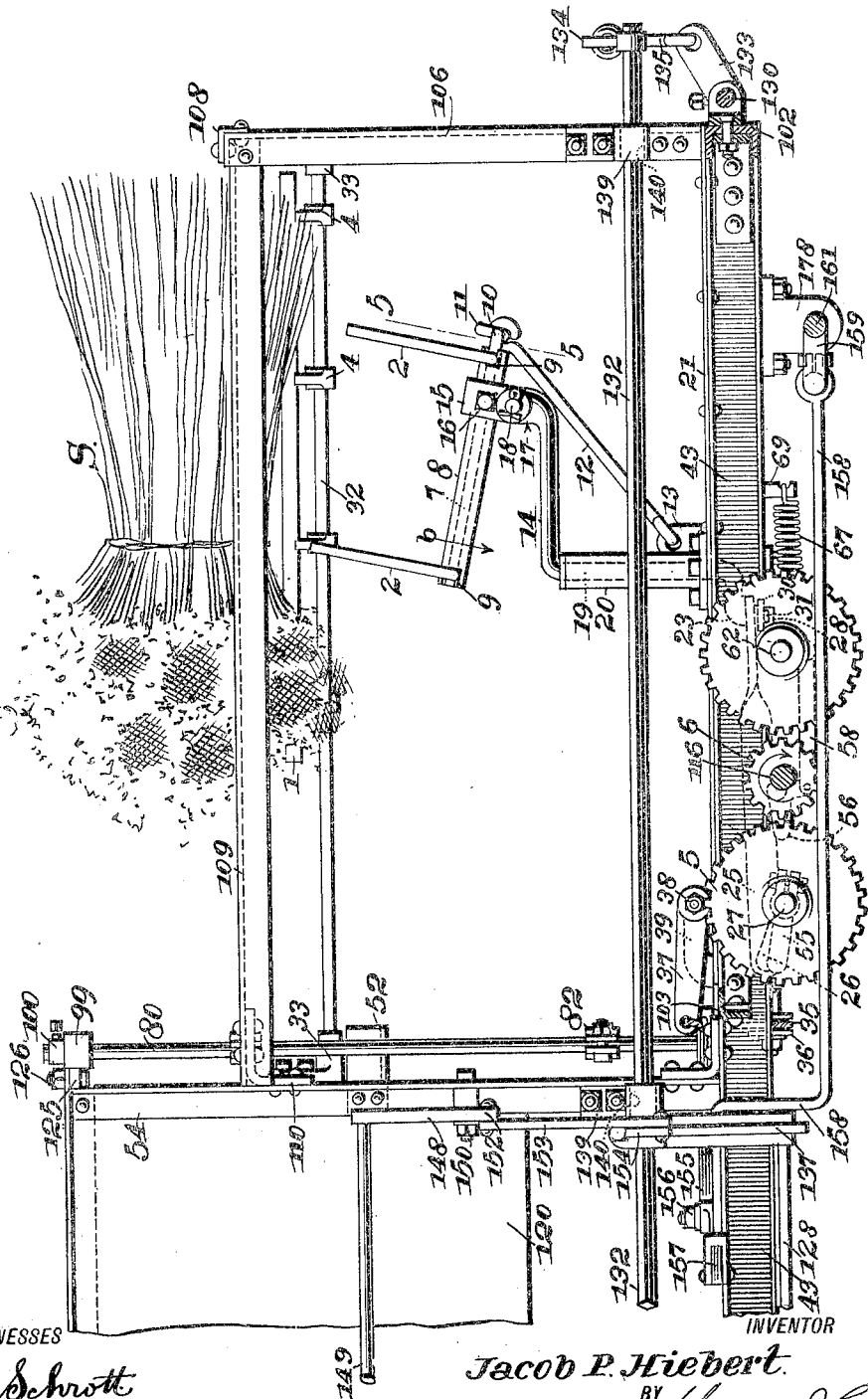

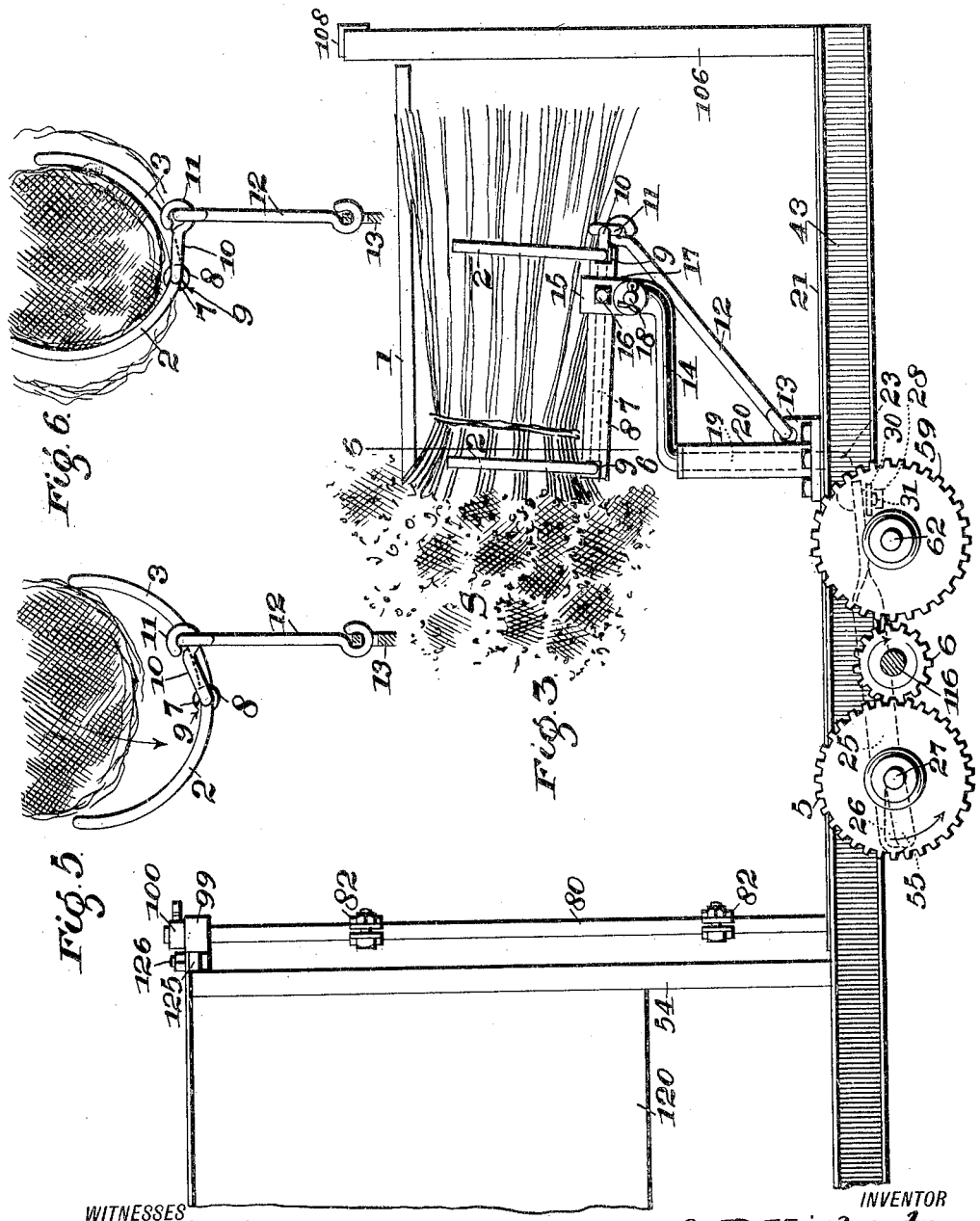

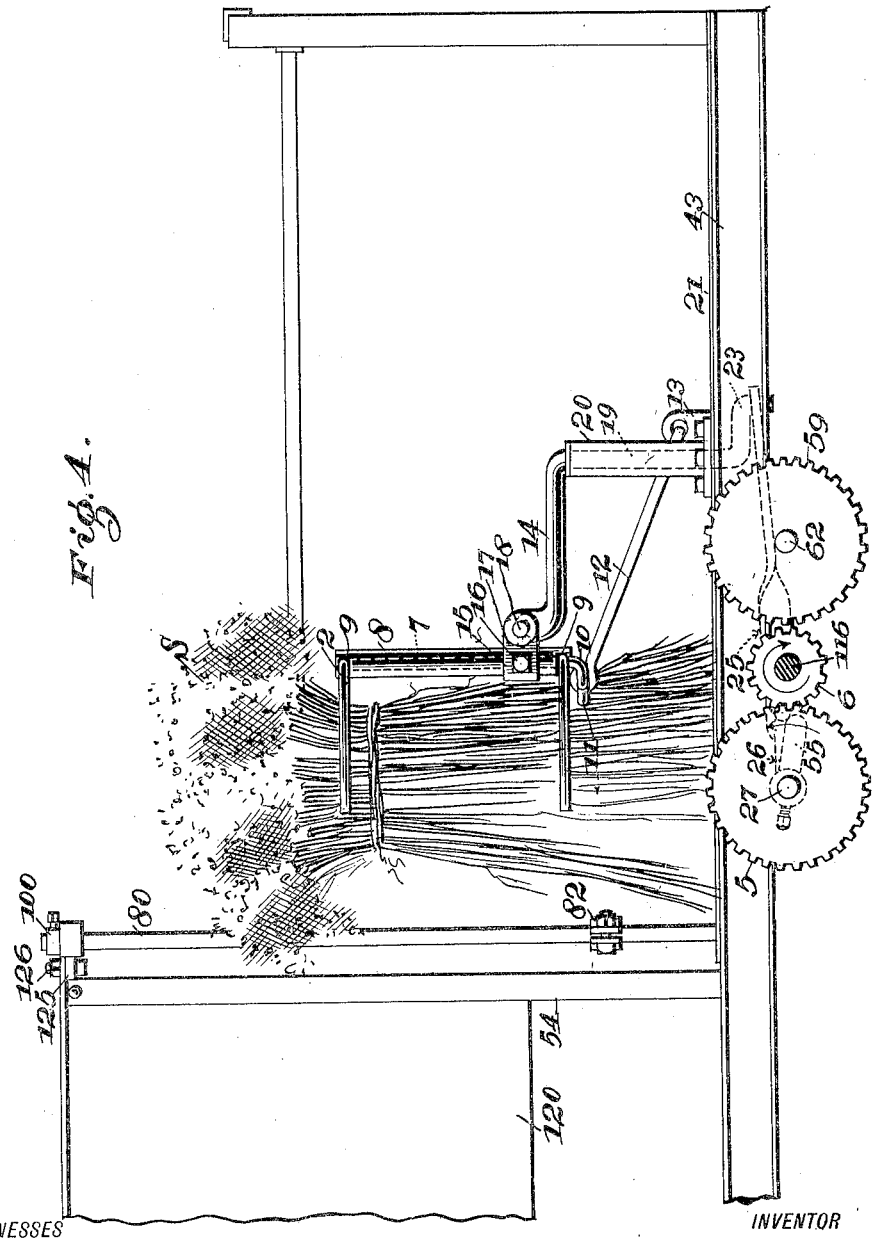

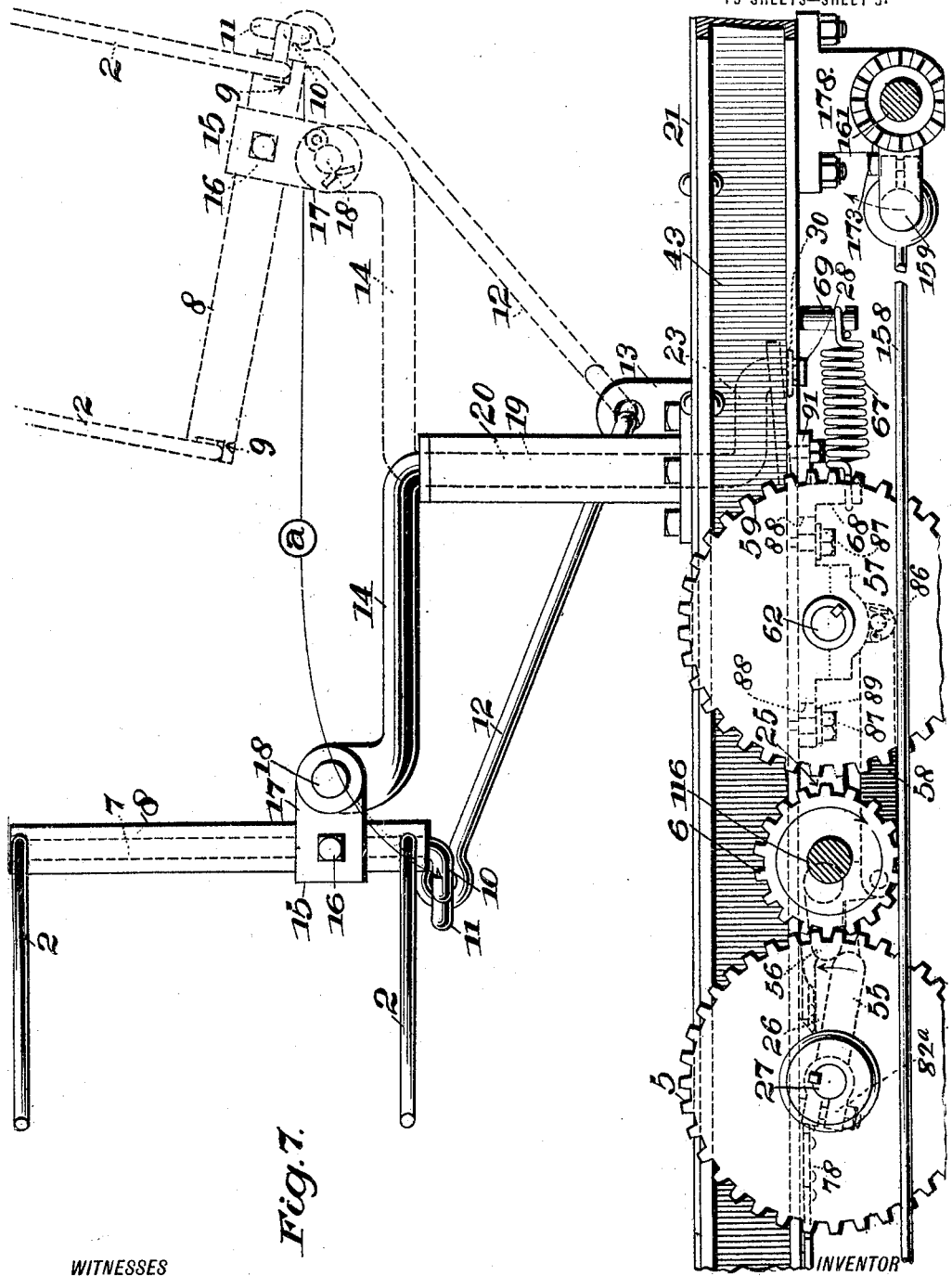

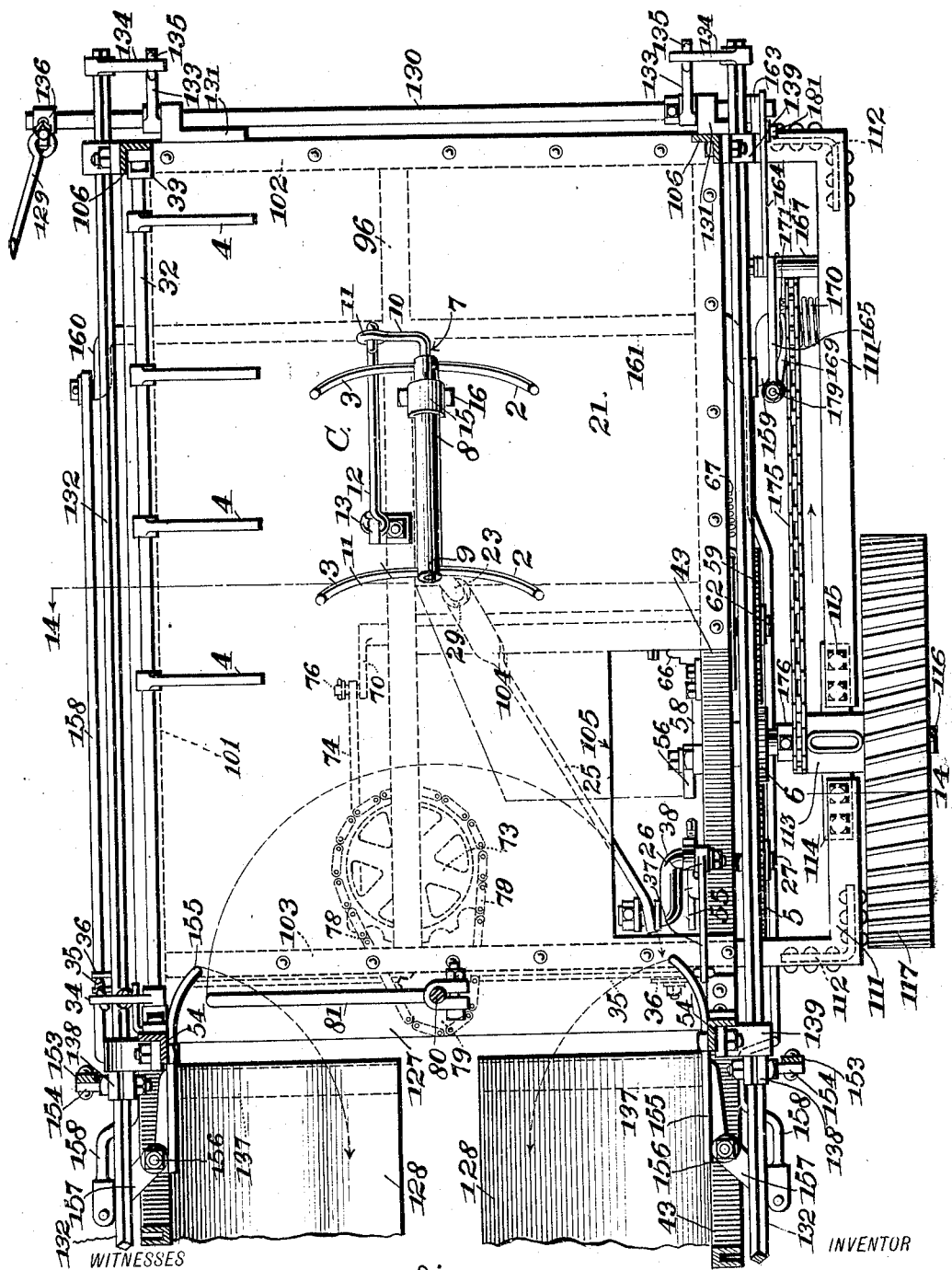

J. P. HIEBERT.
GRAIN SHEAF SHOCKER.
APPLICATION FILED AUG. 7, 1919.
1,373,727.
Patented Apr. 5, 1921.
13 SHEETS—SHEET 7.
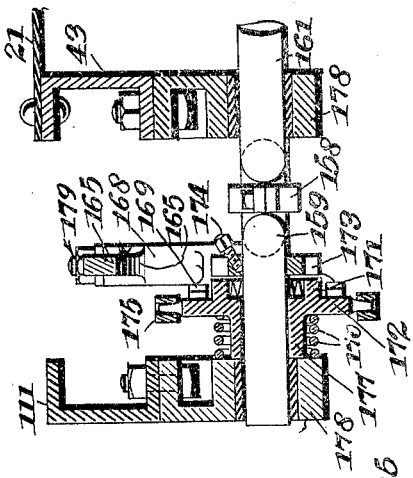
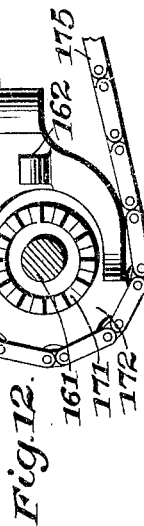
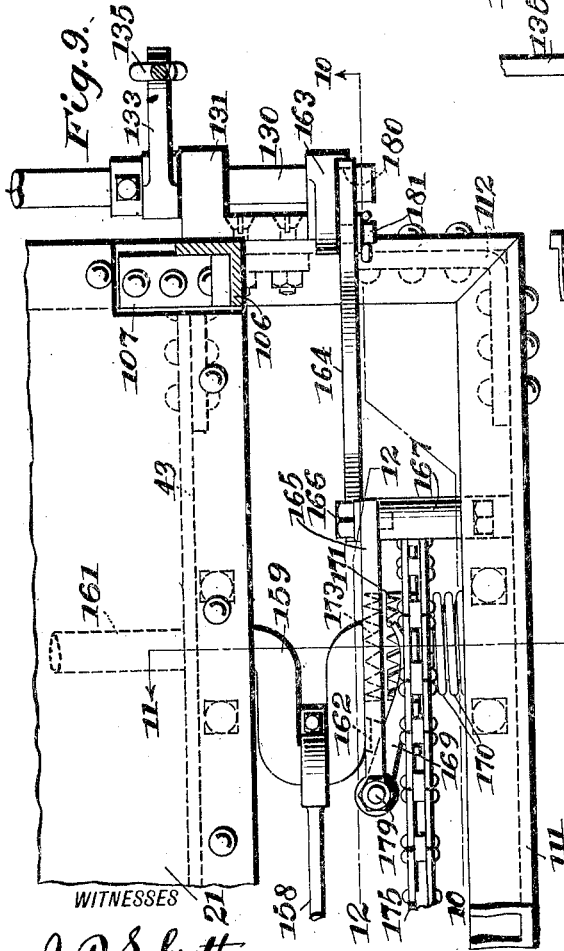
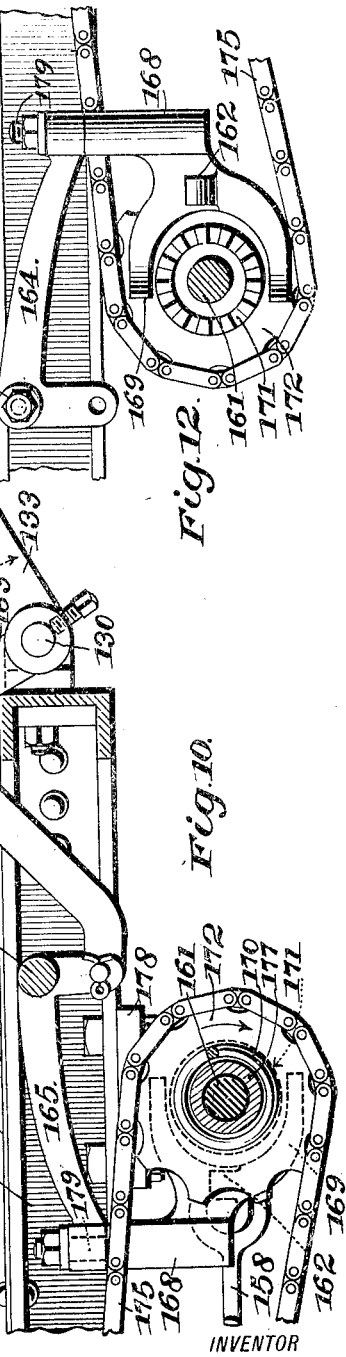
WITNESSES
J. P. Schrott
INVENTOR
Jacob P. Hiebert.
BY
ATTORNEYS

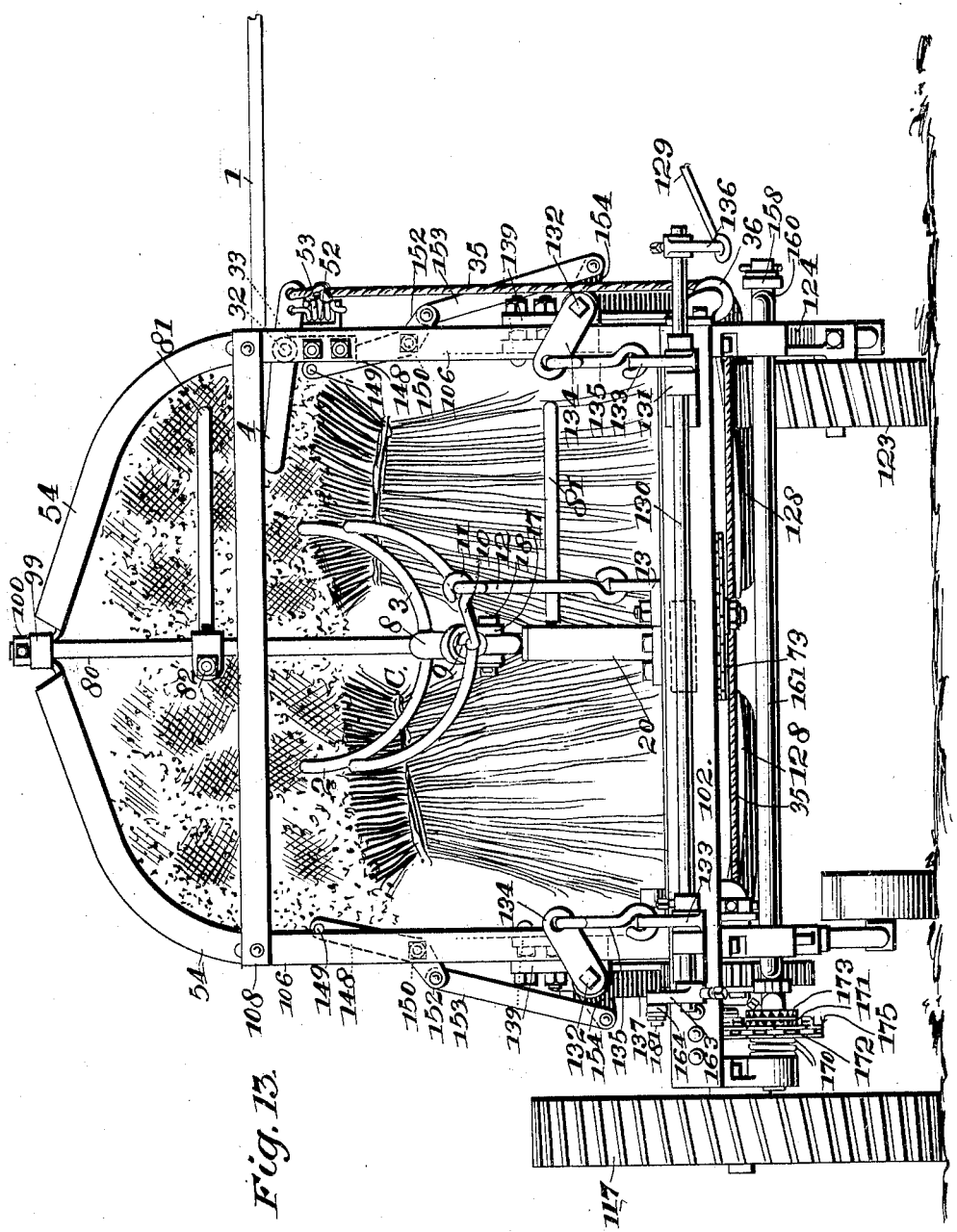

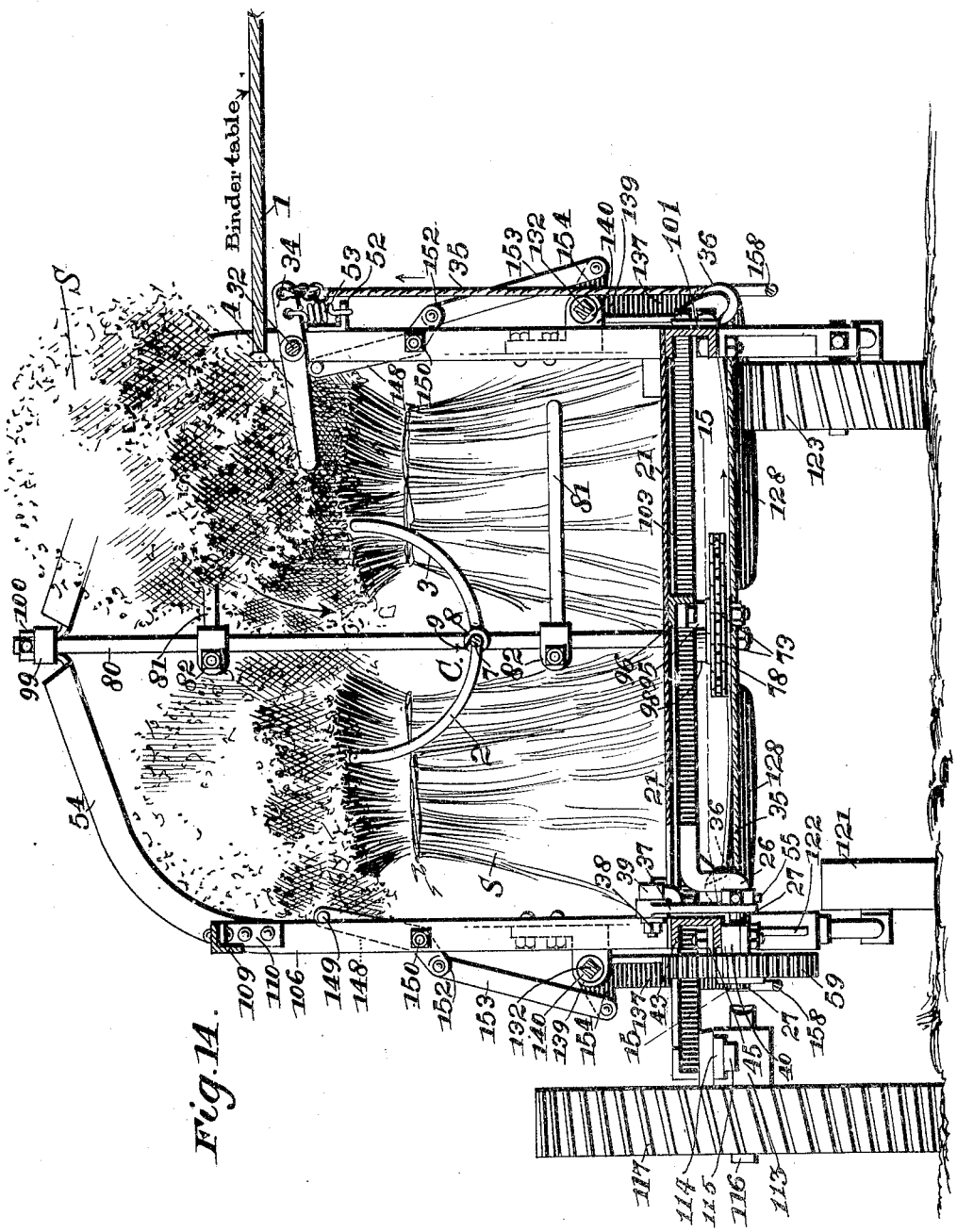

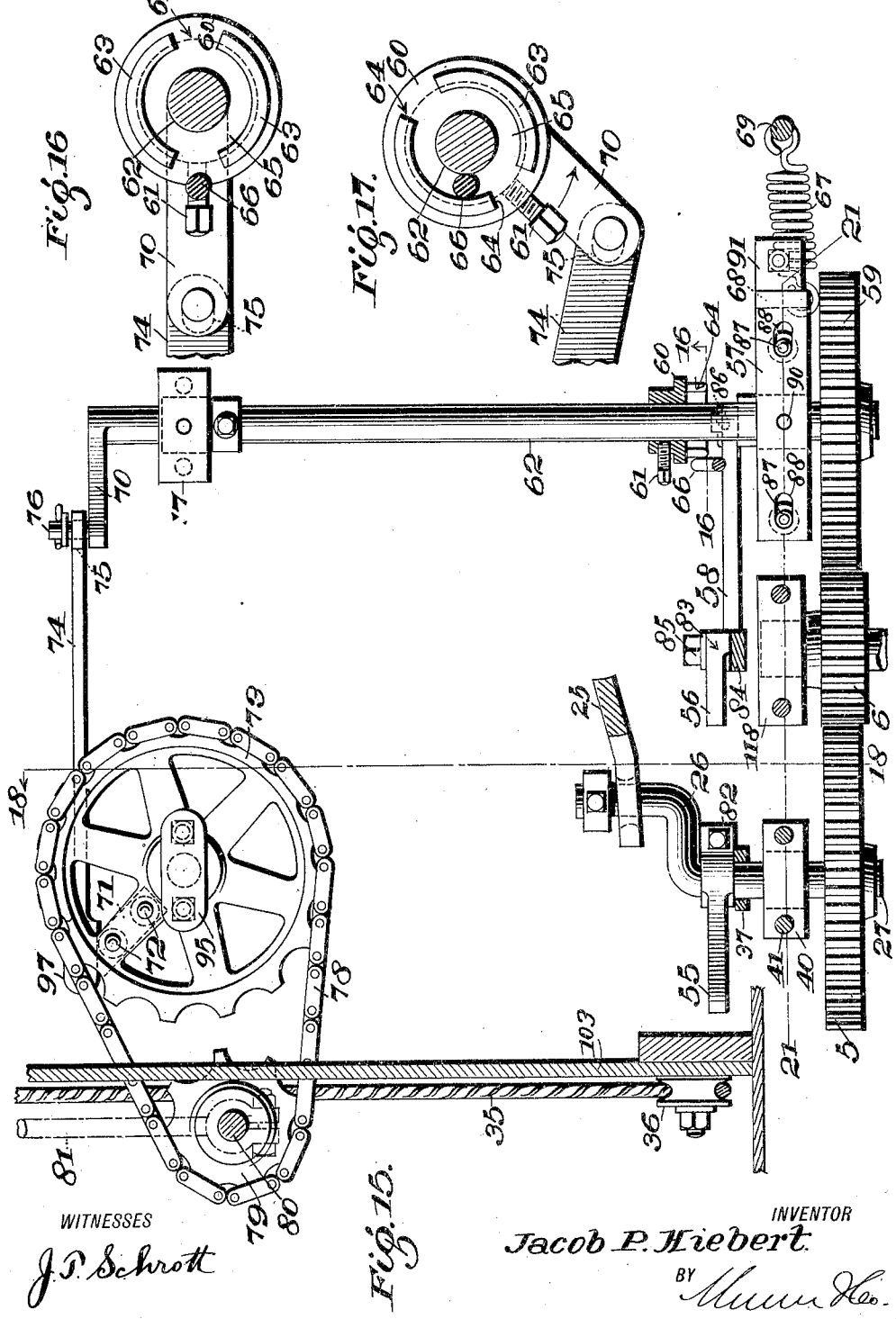

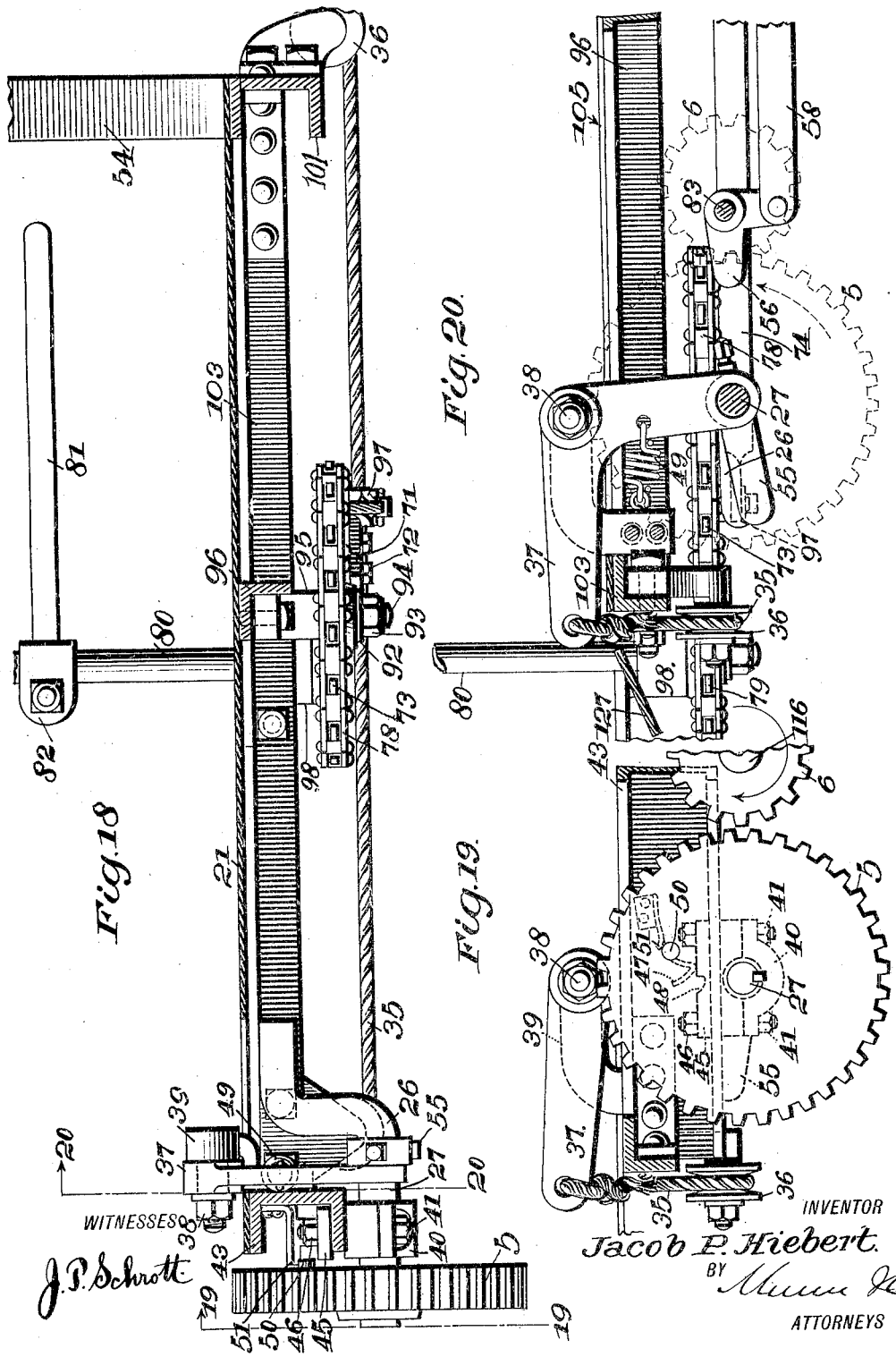

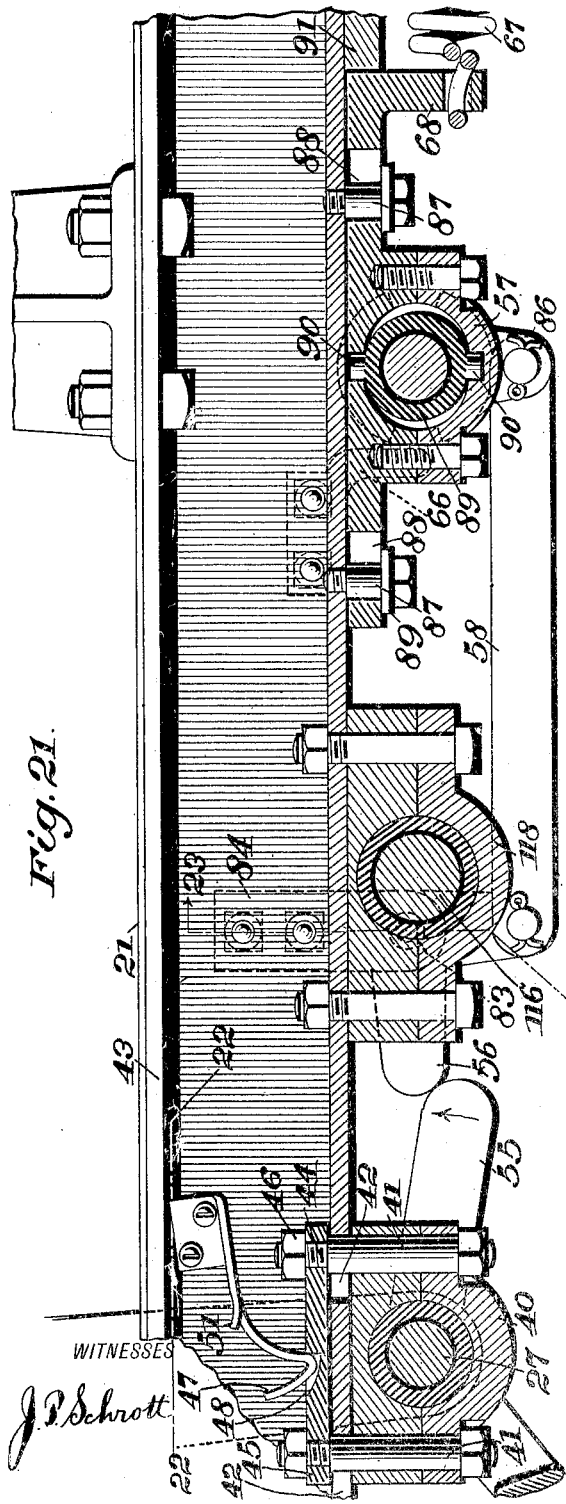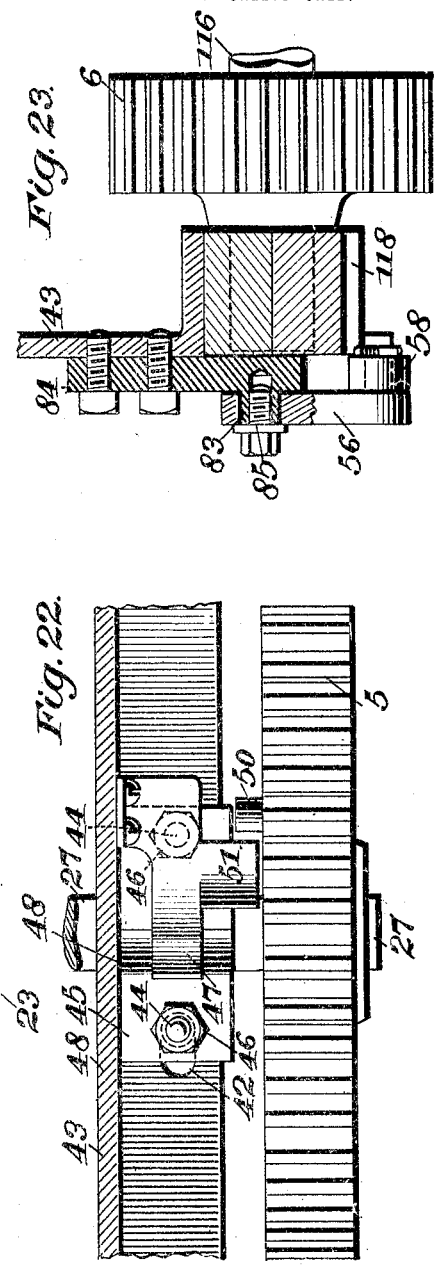

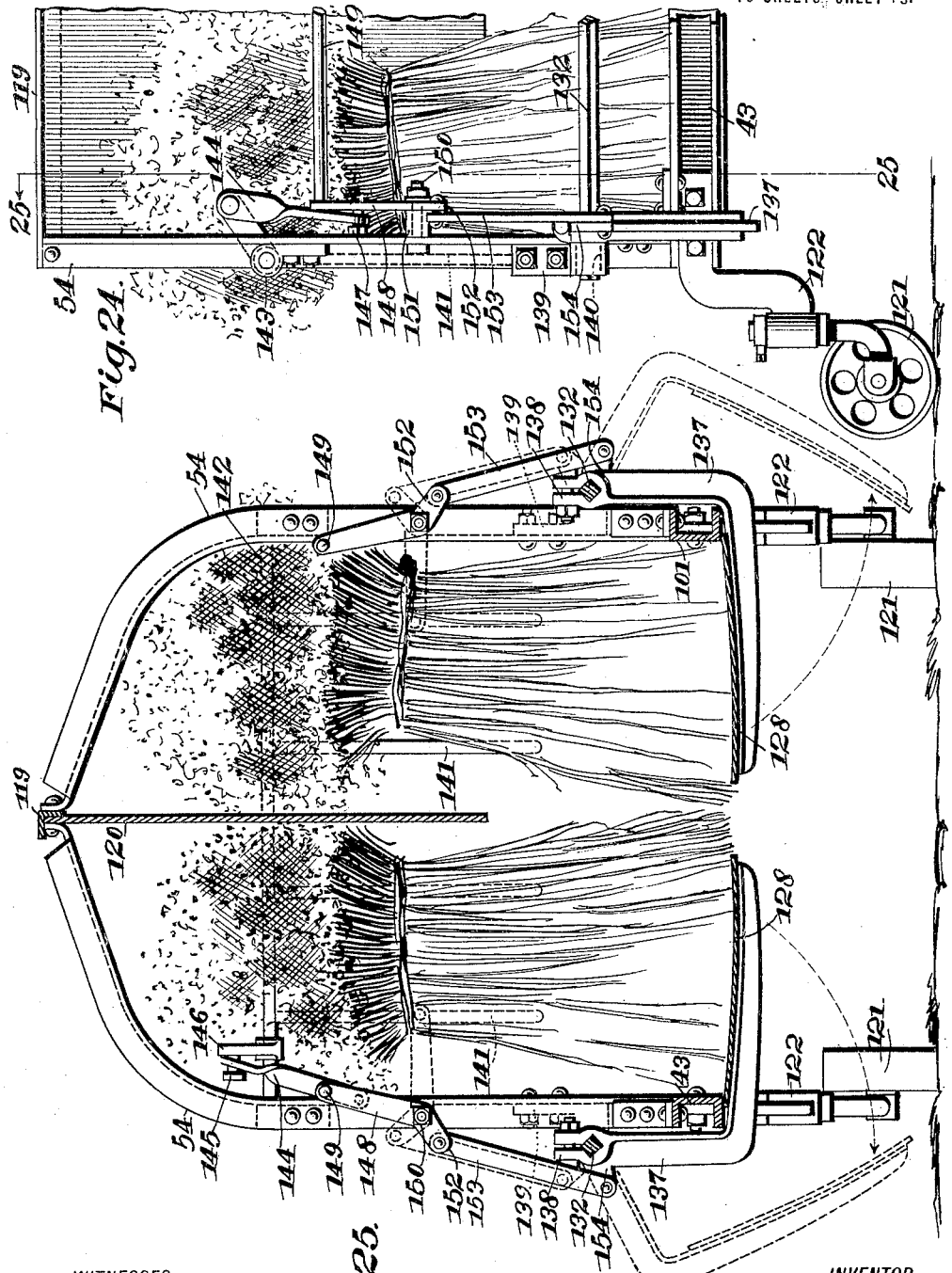

UNITED STATES PATENT OFFICE.

JACOB P. HIEBERT, OF HILLSBORO, KANSAS, ASSIGNOR TO HILLSBORO SHOCKER AND MACHINE CO., OF HILLSBORO, KANSAS, A CORPORATION OF KANSAS.

GRAIN SHEAF-SHOCKER.

1,373,727.  Specification of Letters Patent.  Patented Apr. 5, 1921.

Application filed August 7, 1919. Serial No. 315,922.

*To all whom it may concern:*

Be it known that I, JACOB P. HIEBERT, a citizen of the United States, and a resident of Hillsboro, in the county of Marion and State of Kansas, have invented certain new and useful Improvements in Grain Sheaf-Shockers, of which the following is a specification.

My invention relates to improvements in grain sheaf shockers, and it consists in the constructions, combinations and arrangements herein described and claimed.

The foremost object of my invention is to provide a comparatively simple sheaf shocking mechanism to be used in conjunction with any ordinary reaper, all of the functions of the mechanism being automatically performed, with the exception of the final shock discharging operation, which is manually performed.

Another object of the invention is to provide a shock forming mechanism, in which the various operations of handling the sheaves in the course of forming a shock, are automatically controlled and accomplished by the individual sheaves themselves.

Other objects and advantages will appear in the following specification, reference being had to the accompanying drawings, in which:—

Figure 1 is a side elevation of the improved sheaf shocker, showing the position of the parts in the shock discharging operation, Fig. 2 is a detail side elevation, with parts in section, showing the initial position of the parts preparatory to catching a sheaf in the cradle, Fig. 3 is a detail side elevation of only so much of the mechanism in Fig. 2 as is necessary to illustrate the second position in which the sheaf is gripped by the cradle, Fig. 4 is a detail side elevation showing only so much of the mechanism in Fig. 2 as is necessary to illustrate the third position in which the sheaf is stood erect on the platform by the cradle, Fig. 5 is a detail section taken substantially on the line 5—5 of Fig. 2, and showing the normal position of the sheaf grippers before the sheaf falls into the cradle, Fig. 6 is a detail cross section taken substantially on line 6—6 of Fig. 3, showing the sheaf grippers as automatically moved to the gripping position by the weight of the sheaf, Fig. 7 is a detail view, showing the cradle in the initial position in dotted lines and in the erecting position in full lines, the cradle being about to return and other mechanism being about to be operated to effect the sheaf switching and packing action, Fig. 8 is a plan view of the parts shown in Fig. 2, portions being shown in section, Fig. 9 is a detail view of the main part of the shock pusher mechanism shown in the lower right-hand corner of the frame in Fig. 8, Fig. 10 is a longitudinal section on the line 10—10 of Fig. 9, Fig. 11 is a cross section on the line 11—11 of Fig. 9, Fig. 12 is a longitudinal section on the line 12—12 of Fig. 9, Fig. 13 is a front elevation of the sheaf shocker, Fig. 14 is a cross section of the sheaf shocker, taken substantially on the line 14—14 of Fig. 8, and illustrating the action when a sheaf rolls off of the binder table, Fig. 15 is a detail horizontal section taken substantially on the line 15—15 of Fig. 14, principally showing the sheaf switching gear mechanism near the top, and the erecting, driving and switching gears at the bottom, Fig. 16 is a detail cross section on the line 16—16 of Fig. 15, showing the shifting holder of the shifting shaft in the normal position, Fig. 17 is a view similar to Fig. 16, showing the shifting holder in operative engagement with the holder stud to keep the switching gear in mesh with the driver for a predetermined length of time, Fig. 18 is a detail cross section taken substantially on the line 18—18 of Fig. 15, Fig. 19 is a detail side elevation of the erecting gear and its associated parts, viewed in the plane 19—19 of Fig. 18, Fig. 20 is a vertical section taken substantially on the line 20—20 of Fig. 18, showing the position of the parts associated with the erecting gear, when the gear is in the second or sheaf-erecting position, Fig. 21 is a detail longitudinal section taken substantially on the line 21—21 of Fig. 15, showing the bearing boxes of the various shafts, Fig. 22 is a detail horizontal section on the line 22—22 of Fig. 21, showing the spring for automatically holding the erecting gear in mesh with the driver until it is automatically released by the gear, Fig. 23 is a detail vertical section on the line 23—23 of Fig. 21, showing the mounting of the shifting elbow.

Fig. 24 is a detail side elevation of the rear end of the shock compartment, showing the parts in the normal position, and Fig. 25 is a vertical section on the line 25—25 of Fig. 24, showing the bottom gate closed in full lines, and open in dotted lines.

By way of preface, mention is desired to be made of my former patent on grain sheaf shockers, patented April 18, 1916, No. 1,180,038. So far as similarity of structure between the mechanism in this patent and that herein shown and described, is concerned, there is nothing in common with the exception that in both of my inventions all of the operations necessary to form the shock are automatically performed by the individual sheaves as they fall from the binding table. Also, in both inventions, the final operation of discharging or setting the shock on the field, is accomplished manually.

In order to enable the reader to quickly understand the construction and mode of operation of this sheaf shocker, the five major actions which take place in succession are described below in the following order: (1) The sheaf catching action, (2) the sheaf gripping action, (3) the sheaf erecting action, (4) the sheaf switching and packing action, and (5) the sheaf discharging action.

*(1) The sheaf catching action.*

Attention is directed to Figs. 2, 5, 13 and 14. A previously tied bundle or sheaf of grain is discharged from a reaper with which the sheaf shocker operates in conjunction, falling on the binder table 1, from which it rolls in a substantially horizontal position into the normally outstretched or open arms of the cradle, by which the sheaf is caught and automatically held.

In passing from the binder table 1 to the open arms 2, 3 of the cradle C, the sheaf S moves over the arms 4 of the depressible chute. These arms normally occupy the position shown in Fig. 13. When the sheaf S passes thereover, they move to the position shown in Fig. 14 by virtue of the weight of the sheaf. They serve to prevent the sheaf from falling down between the binder table and the cradle, but also perform the important function of automatically shifting the erecting gear 5 into operative engagement with the main driver gear 6.

The operation of shifting and rendering the erecting gear 5 active, takes place just an instant before the sheaf S is caught and gripped by the arms of the cradle C, so that the two actions are substantially simultaneous. The mechanisms brought into play and the manner of operation thereof, are fully described below, under the description of the sheaf erecting action.

*(2) The sheaf gripping action* takes place automatically when the sheaf S falls into the cradle C. For the construction of the cradle C, attention is directed to Figs. 2, 3, 5, 6, 7, 8 and 13. The back of the cradle consists of a rod 7 over which a sleeve 8 is fitted. The sleeve has a limited free turning movement on the rod, but has no endwise movement, it being thus prevented by the cradle arms 2 which are suitably attached to the rod 7, as clearly shown in Figs. 5, 6 and 7.

Stop recesses 9 in the extremities of the sleeve 8, accommodate the cradle arms 2, and limit them in their movement from the normally open position in Fig. 5 to the second or gripping position in Fig. 6. The arms 3 are suitably affixed to the sleeve 8, preferably in line with the arms 2 as shown in Fig. 8.

The rod 7 is bent at right angles to form a crank arm 10. The crank arm terminates in an eye 11 to which the upper eye of the limiting link 12 is connected. The limiting link in turn, is connected to the bracket 13 by means of another eye in the lower end of the link. The upper and lower eyes of the link are turned at right angles to each other for the purpose of freely accommodating the partial turning movement of the crank arm 10 with respect to the sleeve 8 in the sheaf gripping action, and then to accommodate the swinging action along the line a in Fig. 7, in the sheaf erecting action.

Normally, the cradle arms 2 and 3 stand as far apart as the stop recesses 9 in the sleeve 8 will permit. The arms are then said to be open. The cradle normally stands substantially in the position shown in Fig. 2. It is made to normally assume this position by virtue of the combined effort of the limiting link 12 on the crank arm 10, and the movement of the carrier crank 14 to the normally forward position.

As soon as the sheaf S falls into the cradle C so that the weight of the sheaf bears down on the extremity of the cradle back, the arms 2 are made to automatically move into the position in Fig. 6 and thereby grip the sheaf so that it cannot fall or slide out of the cradle in the movement between the position in Fig. 3 to that in Fig. 4.

A yoke 15 receives the sleeve 8 near the lower end. The two are suitably secured together by fastening means 16, but this means does not pass through to impede the partial rotatory movement of the rod 7. The yoke has a bearing extension 17 which is bifurcated to receive the end of the crank 14. A pin 18 secures the parts together and constitutes a fulcrum on which the cradle moves from the position in Fig. 2 to that in Fig. 3. The sheaf gripping action is automatically effected by this movement by reason of the following construction: The limiting link 12, having swinging movement only in a prescribed zone, acts as a fulcrum on which the crank arm 10 turns, or rather shifts its position, when the free extremity of the cradle back is borne down by the weight of the sheaf S. It can be easily understood that in bearing down on the extremity of the cradle, the rod 7 is caused to partially rotate in the sleeve 8, and the arms 2 thereby made to move inwardly as in Fig. 6 to grip the sheaf.

This grip on the sheaf is maintained long enough to prevent the sheaf from accidentally falling out of the cradle. The grip is gradually relaxed after the cradle C and limiting link 12 pass a point substantially in the middle of the line $a$ in Fig. 7, and by the time that the final position of the cradle is reached, as in full lines in Fig. 7, the grip will be entirely relaxed so that the arms 2 and crank arm 10 again assume the positions they originally assumed in Fig. 2.

The carrier crank 14 forms a part of the carrier shaft 19, which is journaled in a bearing sleeve 20 on the platform 21 of the shocker. The lower end of the shaft 19 has the erecting arm 23 which is operable in a horizontal plane. An erecting pitman 25 operatively joins the arm 23 with the erecting crank 26 which is a part of the erecting shaft 27 on which the erecting gear 5 is secured.

The erecting arm 23 includes a pin end 28 which occupies the short slot 29 in the front end of the pitman 25. A washer 30 substantially covers the slot and a cotter pin 31 holds the washer and pitman in place. The slot 29 is necessary to compensate for the shifting movement of the erecting gear 5 from the position in Fig. 2 to that in Fig. 3, when the arm 23 and pitman 25 are in the normal positions.

(3) *The sheaf erecting action.*

For the illustration of this action, attention is directed to Figs. 7, 18, 19, 20, 21 and 22. As already stated, the actions of shifting the erecting gear 5 into operative engagement with the continuously rotating driver 6, catching and gripping the sheaf S, are substantially simultaneous, because the sheaf rolls across the depressible chute 4 so quickly, so that the chute is no sooner depressed than the sheaf is caught and gripped.

The arms 4, of which there is a suitable number, are suitably affixed to the arm-carrying shaft 32 which is journaled in bearings 33 at the respective ends. The shaft 32 carries a pull arm 34 near the rear end, to which the cable 35 is attached. The cable runs over pulleys 36 and is attached to the free end of the gear-shifting bell crank 37.

The bell crank 37 is pivotally mounted at 38 on the bracket 39. The downwardly extending arm of the bell crank 37 embraces the erecting shaft 27, so that when the bell crank is rocked on the fulcrum 38 by virtue of pulling on the cable 35 on the depression of the arms 4, the erecting gear 5 is moved into operative engagement with the continuously rotating driver 6, thereafter making a complete revolution when it is again automatically disengaged.

The erecting shaft 27 is journaled in a shifting box 40, which is in actual practice, sufficiently broad to provide an ample bearing for the shaft. The members of the box 40 are held together by bolts 41 which extend through slots 42 in the longitudinal channel iron 43 on the shocker frame. Thereafter, the bolts 41 terminate in reduced spindles 44 on which the slide plate 45 is fitted as clearly shown in Figs. 19 and 21.

Nuts 46 press the slide plate firmly against the shoulders on the bolts 41, the arrangement of the shoulders being such that the free sliding movement of the plate 45 on top with the box 40 beneath, is not impaired. A lock spring 47 engages the lock recess 48 in the slide plate 45, when the erecting gear 5 is moved into operative engagement with the driver 6.

Normally, the lock spring 47 does not engage the recess 48, but rests on top of the slide plate, as in Fig. 19. It is only when the gear 5 is shifted over, that the lock spring and recess engage. The gear 5 makes a complete revolution before the erecting shaft 27 is reversely shifted by the spring 49. This action takes place when the lifter stud 50 on the erecting gear 5 moves beneath the heel 51 on the lock spring 47, and lifts the spring out of the recess 48 so that the shaft 27 and its companion parts can shift back by virtue of the tension of the spring 49.

Assuming the erecting crank 26, pitman 25, cradle C, and the other associated parts to stand in normal position shown in Fig. 2, the rolling of the sheaf S across the arms 4 of the depressible chute causes the shifting of the erecting gear 5 against the continuously rotating driver 6. Upon making a half revolution of the erecting gear 5, the cradle C will have stood the sheaf in the erect position on the platform 21 as in Fig. 4. It is now necessary to return the cradle C to the starting position. This is accomplished by the continued rotation of the gear 5 through another half revolution, whereupon the parts will be restored to the original position in Fig. 2. Since the lifter stud 50 is located in substantially the same radial position as the erecting crank 26, the automatic releasing of the erecting gear by virtue of disengaging the lock spring 47, takes place simultaneously with the return of the cradle.

Reverting to the depressible chute structure, the pull arm 34 is normally held in engagement with the stop bracket 52, by a spring 53 so that the arms 4 of the depressible chute normally occupy the position in Fig. 13. The stop bracket 52 is secured to one of a plurality of bower standards 54. These standards form a part of the shock compartment which is more fully described under the description of the shock discharging action.

*(4) The sheaf switching and packing action.*

Attention is directed to Figs. 7, 14, 15, 16, 17 and 21. This action commences as soon as the sheaf S is set down in the erect position on the platform 21.

As soon as the erecting shaft 27 has made a half revolution to bring the cradle C in the erect position described above, a trip arm 55 engages the shifting elbow 56, pulling the shifting box 57 toward the left through the shifting link 58, and thereby operatively engaging the switching gear 59 with the continuously rotating driver 6. The switching gear 59 is held in mesh with the driver 6 to make a half revolution, by means of the shifting holder 60 secured at 61 to the switching shaft 62 by which the gear 59 is carried.

The shifting holder 60 has a flange 63 with diametrically opposite openings 64 which lead into the passage 65 which is arranged to receive the stationary holder stud 66. Normally, one of the openings 64 stands in alinement with the holder stud 66 as in Figs. 15 and 16, so that when the box 57 is shifted over as explained, the stud will be made to occupy the passage 65 and thereby automatically keep the switching gear 59 in engagement with the driver 6 until the opposite opening 64 is reached, whereupon the box 57 is shifted back and the switching gear 59 moved out of engagement with the driver 6, by virtue of the spring 67. The spring 67 is connected between the bracket 68 on the shifting box and a stud 69 pendent from the channel iron 43.

The switching crank 70 has connection with the switching arm 71 which is suitably secured at 72 to the switching sprocket 73, by the switching pitman 74. The pitman 74 has a slot 75 which fits over the pin 76 on the crank 70. The purpose of the slot is to make the connection between the pitman and crank sufficiently loose to compensate for the twisting or slight turning movement of the switching shaft 62 in the bearing 77, when the box 57 is shifted.

A chain 78 joins the switching pinion 79 on the lower end of the packer shaft 80, to the switching sprocket 73. The packer shaft 80 carries a plurality of switching arms 81 which are suitably secured to the shaft by means of the clamps 82. The packer shaft 80 is located in the middle of the entrance to the shock compartment. The switching arms or rods 81 stand either at one or the other side.

Assume the parts to be in the position in Fig. 13. When the switching gear 59 is made to rotate through a half revolution, the switching crank 70 also moves through a half revolution until it occupies the position diametrically opposite to that shown. An equal amount of movement will be imparted to the switching arm 71 and this is sufficient to turn the packer shaft 80 through a half revolution, move the switching rods 81 to the opposite side in front of the other half compartment, and consequently carry with them the sheaf S which was set down on the platform 21 in the path of the rods 81.

It has been explained that the switching gear 59 makes only a half revolution at a time. When the switching gear 59 is again shifted into engagement with the driver 6, the half revolution then following will serve to return the switching crank 70 to the original position shown in Fig. 15, consequently restoring the switching rods 81 to the original position, and in doing so, they shove a sheaf into the other half compartment. This intermittent swinging motion of the switch rod takes place at the proper times, and as the reader now already clearly understands, is governed automatically by the sheaf itself.

The trip arm 55 is suitably secured to the erecting shaft 27 at 82$^a$, by means which will permit adjustment of the trip arm so as to accelerate or retard the time of engagement with the shifting elbow 56. The elbow 56 is in the shape of a bell crank and is journaled on the stud 83 which projects from the bracket 84. The bracket is pendent from the channel iron 43. The elbow 56 is retained on the stud 83 by suitable securing means 85 which is of such a nature that the elbow remains free to move on the stud.

Any suitable connecting means may be employed for joining the shifting link 58 to the elbow 56 at one end and to the ear 86 at the other end. The ear 86 is a part of the shifting box 57. Bolts 87 secure the box 57 beneath the channel iron 43 and pass through slots 88 in the lateral portions of the box, so as to enable the necessary shifting movement of the box.

These bolts have reduced threaded ends which provide shoulders to be tightly screwed against the channel iron. Washers 89 of ample size, support the box 57 and provide sufficient bearings therefor.

Attention is directed to the construction of the bearing portion of the boxes 57 and 77, in which the switching shaft 62 is journaled. These bearings 89 have trunnions 90 to enable the necessary amount of turning movement of the bearings in the respective boxes when the front box 57 is shifted. It is believed that the necessity for this provision is perfectly apparent without further description. A stop plate 91 limits the movement of the shifting box 57 through the effort of the spring 67.

Continuing now to the switching sprocket 73, it is to be observed that this sprocket is suitably supported on the bearing washer 92 in Fig. 18, which is held in place by the nut 93 on the stem 94 of the bearing bracket 95. This bracket is secured to an angle iron 96, which is a part of the frame structure. The connection between the twisted end 97 of the switching pitman 74 and the switching arm 71, is sufficiently loose to prevent binding when the switching pitman 74 assumes an angled position with respect to the arm 71 in the movement of the crank 70.

The switching pitman 74 will not strike the switching sprocket 73 for these reasons: The first half revolution of the switching crank 70 from the position in Fig. 15 is downward because the switching gear 59 rotates in a counterclockwise direction. When the second half revolution of the shaft 62 takes place, the crank 70 and pitman 74 will approach the sprocket 73 from above, but at this time the arm 71 will stand off to the right. The parts are so disposed that the pitman 74 will straighten out in time to prevent contact therebetween and the periphery of the sprocket.

A suitable bearing 98 supports the packer shaft 80 at the bottom, while another bearing 99 supports it at the top. A set collar 100 keeps the shaft from dropping down. There were a number of occasions in the description above where a description of

*The shocker frame* had to be referred to, and it is therefore thought wise to describe this portion of the structure before proceeding with the description of the shock discharging action. Attention is directed to Figs. 1, 2, 8 and 25. The channel iron 43 has already been mentioned. There is a corresponding channel iron 101 on the other side. Both are of equal length and run parallel to each other. The angle iron 96 has also been mentioned. It is suitably secured in place between the front and mid angle bars 102, 103. Relatively short angle bars 104 extend from the central iron 96 to the channel 43 for the support of the standards of the bearing 20, and all of the various angle bars form a foundation on which the platform plate 21 is laid. The platform is cut out at 105 to make room for the movement of the mechanism shown.

Standards 106 rise from the front angle bar 102 to which they are suitably secured by the means 107 in Fig. 9. These are braced at the top by a bar 108, and an angle bar 109 extends rearwardly from the standard 106 nearest the observer in Fig. 2 to rigidify the standard structure.

The various standards are necessary to provide supports for the various bearing brackets shown particularly in Fig. 8. The angle bar 109 is secured at 110 to the foremost lower standard 54 mentioned above. Before describing these standards, it is to be observed in Fig. 8, that the front and mid angle bars 102, 103 include extensions toward the observer, to which angle bar sections 111 are suitably secured at 112, to provide a working space for parts of the mechanism and a support for the main bearing 113.

This bearing has lateral flanges 114 which are suitably secured at 115 to the sections 111 as clearly shown in Fig. 8. The main drive shaft 116 is journaled in this bearing. This shaft carries the large bull wheel 117 on the outside and the driver gear 6 on the inside. The shaft and gear 6 rotate continuously while the shocker moves over the ground. The inner end of the main drive shaft 116 is journaled in a bearing 118, secured beneath the channel 43, as clearly shown in Fig. 21. Referring now to the construction of the bower standard 54, it is to be observed in Fig. 1 that there are three sets of these, that is to say, they are erected from the channel irons 43, 101 on each side and are bent over toward the center where they are secured to the ridge angle iron 119 in Fig. 25. A partition plate 120 extends down from the ridge angle iron 119 and keeps the sheaves in the compartments formed.

Casters 121, journaled in brackets 122 which extend rearwardly and downwardly from the main channel iron, support the shock compartments. The large bull wheel 117 is supplemented by a smaller wheel 123 which is suitably supported on a bracket 124, pendent from the channel iron 101 at the front.

The upper bearing 99, described above, has a lug 125 to which the front end of the ridge iron 119 is secured at 126 in Fig. 2. It is also to be observed that the platform plate 21 has a short rearward extension beyond the mid angle bar 103, constituting an apron 127 on which the sheaves slide from the platform 21 to the bottom gate 128 in the shock compartments. The apron 127 also covers the switching pinion 79 and keeps refuse from accumulating thereon. The foregoing completes the general description of the shocker frame and the description of

(5) *The shock discharging action* may now be proceeded with. Attention is directed to Figs. 1, 8, 9, 10, 11, 12, 13, 24, and 25. The operation of dumping the shock onto the field in the erect position, is accomplished manually by pulling on the rod 129, which leads to any suitable place within convenient reach of the operator. On pulling the rod 129, the dump shaft 130 is partially turned in its bearing 131 on the front angle bar 102, so that the non-circular gate shafts 132 are partially rotated outwardly and in opposite directions to each other, by virtue of the dump arms 133, 134, and the connecting links 135. The dump shaft 130 carries an arm 136, to which the rod 129 is joined. The dump arms 133, 134 are carried by the respective shafts 130, and 132, as clearly shown in Figs. 8 and 13.

The partial turning of the gate shaft 132 in opposite directions, causes the bottom gate 128 to move to the dotted line position in Fig. 25 and thereby let the shock drop to the ground. Gate elbows 137 carry the gate and normally support the shock in the shock compartment. These are clamped to the non-circular shafts 132 by suitable means 138. Bearings 139, secured to the various standards along the machine, support the non-circular shafts 132. Circular bushings 140 on the non-circular shafts, enable free turning movement in the bearings.

A number of movements take place so close together in the action of discharging the shock, that they can be said to be simultaneous. In fact, they are all begun by pulling the dump rods 129. These movements are: (*a*) lowering the bottom gate, (*b*) raising the end grid, (*c*) pressing the shocks together and down, and (*d*) pushing the shocks rearwardly and out. The first of these movements, namely, lowering the bottom gate 128, is fully described above. The second movement consists of

(*b*) *Raising the end grid 141.*

This end grid is in the nature of an end gate and serves to keep the sheaves from falling out of the back during the operation of forming the shocks in the shock compartment. It consists of a suitable number of tongues which are pendent from the grid shaft 142. The grid shaft is journaled in bearings 143 on the rear bower standards 54. A raising link 144 has a loose connection at 145 with the raising arm 146 near enough to the left end of the grid shaft 142 in Fig. 25, to prevent material interference with the adjacent sheaf S when the arm 146 moves downwardly to raise the grid.

The other end of the raising link 144 is loosely connected at 147 to the adjacent presser arm 148. When this arm moves to the dotted line position at the left in Fig. 25, it naturally carries the link 144 with it, consequently causing the end grid 141 to raise to the full line position in Fig. 1. This leads to a consideration of the movement of

(*c*) *Pressing the shocks together and down.*

Presser bars 149 extend the full length of each half shock compartment as clearly shown in Fig. 1. Normally, they stand so close to the bower standards 54 that they are not in the way of the sheaves as they are introduced into the shock compartment.

The presser bars are carried by a plurality of presser arms 148, already mentioned, and these in turn are pivotally mounted on studs 150, which include sleeves 151 by means of which the presser arms are suitably spaced from the adjacent bower standards 54, to which these studs are secured.

Each presser arm 148 includes a crank end 152 to which a presser link 153 is joined. The lower ends of the link 153 are pivotally connected to extensions 154, which form parts of the gate elbows as plainly shown in Fig. 25. As the gate elbows move upwardly and outwardly to the dotted line positions, in Fig. 25, the link 153, crank ends 152 and presser arms 148 are all moved into the dotted line positions, so that the presser bars 149 move inwardly and downwardly to press the tops of the sheaves toward the center and force the shocks downwardly. The last movement consists of

(*d*) *Pushing the shock rearwardly and out.*

This is accomplished by shock pushers 155, which are pivotally mounted at 156 on the channel irons 43, 101, near the entrance to the shock compartment in Fig. 8. Each shock pusher has a pusher arm 157 to which the rear end of a crank rod 158 is joined. The front ends of the crank rod are connected to cranks 159, 160 of the pusher shaft 161.

The pusher shaft 161 is normally inactive and does not move until the shock is to be discharged; then it makes one complete revolution and stops. It stops automatically when the pusher crank 159 arrives beside the yoke abutment 162 after making a complete revolution in the clockwise direction.

But before this happens, the manner of setting the pusher shaft 161 into motion must first be explained. On partially rotating the dump shaft 130 the arm 163 in Fig. 10, pulls the yoke link 164 over to the right, causing the yoke arm 165 to rock on its fulcrum 166 on the bracket 167, and cause the yoke standard 168, together with the clutch yoke 169, to move slightly downwardly. This downward movement of the yoke 169 is sufficient for the disengagement of the yoke abutment 162 from the pusher crank 159, thereby removing the restraint against the clutch spring 170 and permitting it to force the clutch flange 171 on the freely rotatable sprocket 172 into engagement with the clutch collar 173, which is fixed on the shaft 161 at 174.

Motion is imparted continuously to the sprocket 172 by a chain 175 which is driven by a sprocket pinion 176 on the main drive shaft 116. Now assuming that the pusher crank 159 is in the act of making a revolution as mentioned above, as soon as the crank approaches the yoke abutment 162 from beneath, the clutch yoke 169 will be forced aside by the working action of the crank against the abutment 162, thereby pushing the sprocket 172 outwardly against the tension of the spring 170, whereupon the clutch element 171, 173 will become disengaged and the crank 159 will stop in the normal horizontal position shown in Figs. 8 and 10.

As stated above, the sprocket 172 is loose on the pusher shaft 161. In order to give the sprocket ample bearing on the shaft, it includes the hub 177, which as shown in Fig. 11, also acts as a stop for limiting the outward movement of the sprocket. In this case, the hub abuts the adjacent bearing 178, of which there are three for the shaft 161.

The clutch yoke 169, together with its standard 168, has slight turning movement on the yoke arm 165 by virtue of the pivotal connection 179 clearly shown in Fig. 10. The front end of the yoke link 164 has a slot 180 in which the pins 181 of the arm 163 operate. The purpose of this slot 180 is to slightly delay the operation of the shock pushers 155 in Fig. 8, so as to give a little time for the lowering of the bottom gate, raising the end grid and pressing the shock together and down. However, all of these movements take place practically simultaneously so that the circumstance of the shock dropping to the field and moving so far back out of the shock compartment, that it would be out of the reach of the shock pushers 155, would never arise. While it is desired to avoid any unnecessary repetition, it is thought advisable to give

A brief résumé of the operation.

As the shocker travels over the ground, the main drive shaft 116 and consequently main driver gear 6, is made to rotate continuously. The erecting and switching gears 5 and 59 are normally disconnected from the driver 6 and consequently are normally inactive until set into operation by a sheaf S falling into the cradle C.

Consider Fig. 2. The sheaf grippers 2, 3 are normally wide open and the cradle back stands at the angle shown. The weight of the sheaf S bears down on the free end of the cradle causing the cradle to be depressed to the position in Fig. 3, whereupon the grippers 2 automatically grip the sheaf by virtue of the connections of the crank arm 10 and limiting link 12.

Almost simultaneously with the catching of the sheaf S, or to be more exact, just an instant before, the arms 4 of the depressible chute in Fig. 14 were depressed by the sheaf rolling over them so that the cable 35 was pulled upwardly, the shifting bell crank 37 was rocked on its fulcrum 38 and the erecting gear 5 was moved into engagement with the continuously rotating driver 6. Assume the gear 5 now to be in motion. It rotates in a counter-clockwise direction and makes a full revolution, whereupon it is automatically stopped by the raising of the lock spring 47 through the engagement therewith by the lifter stud 50.

The spring 49 moves the erecting gear 5 back when the lock spring 47 is lifted. A full revolution of the gear 5 is necessary to convey the cradle C from the position in Fig. 2 to that in Fig. 4 and then back again to the original position in Fig. 2.

As soon as a half revolution of the erecting gear 5 has taken place, the trip arm 55, carried by the shaft 27 on which the gear 5 is mounted, actuates the shifting elbow 56 so that the box 57 is shifted toward the left against the tension of the spring 67, and the switching gear 59 is moved into engagement with the continuously rotating driver 6. The gear is automatically held in such driving engagement by the engagement of the shifting holder 60 on the switching shaft 62 with the fixed holder stud 66, and maintains such engagement until the opposite opening 64 approaches the stud 66. The spring 67, by virtue of its tension, moves the shifting box 57 back and the switching gear 59 out of engagement. The switching gear 59 makes only a half revolution at a time and consequently the switching crank 70 stops at every half revolution so that a reciprocating motion of the pitman 74 and an alternately oscillatory motion of the switching sprocket 73, results.

It can thus be readily seen that the switching rod 81 intermittently moves from one side to the other, thereby conveying a sheaf first to one half compartment until the whole shock compartment is filled and packed. The shock compartment ordinarily holds from ten to twelve sheaves, but may be made large enough to hold more. When the shock compartment is full, the operator pulls on the dump rod 129, causing the bottom gate 128 to lower, end grid 141 to rise, the presser bars 149 to move inwardly and downwardly and the shock pushers 155 to push the shock rearwardly.

All of these actions take place substantially simultaneously. On the partial rotation of the dump shaft 130 by pulling the rod 129, the gate shafts 132 are made to partially rotate so as to move the bottom gate 128. The cranks 154, presser links 153, extensions 152, presser arms 148 and raising arms 146, in Fig. 25, are all actuated by the same movement so that the various parts to which these members are connected are made to operate in the manner just described.

The operation of the shock pushers 155 is partly delayed by the provision of the slot 180 in the end of the yoke link 164. But as soon as the pin 181 on the arm 163 reaches the end of the slot, the yoke link 164 is moved, the yoke arm 165 is rocked, and the clutch yoke 169 moved sufficiently to release the clutch yoke and the abutment 162, and permit the clutch spring 170 to move the sprocket 172 into operative engagement by virtue of the clutch flange 171 and clutch collar 173.

On pushing the dump rod 129 in the opposite direction, all of the foregoing parts are restored to the normal positions, whereupon the shock forming operation of the shocker can be resumed.

It is thought unnecessary to show means for the connection of the sheaf shocker with the binding machine to which it is joined in actual practice, since this is a comparatively simple matter and one easily disposed of by using connecting means similar to that shown in my other patent previously mentioned.

While the construction and arrangement of the sheaf shocker as herein described and claimed, is that of a generally preferred form, obviously modifications and changes may be made without departing from the spirit of the invention or the scope of the claims.

I claim:

1. Instrumentalities in a sheaf shocker for automatically controlling shock forming mechanism by the weight of successive sheaves, comprising a shock compartment, instrumentalities for catching and automatically setting a sheaf at the entrance of the shock compartment, and instrumentalities automatically rendered active by the action of setting said sheaf for pushing it into said compartment.

2. A sheaf shocker, comprising a shock compartment, instrumentalities automatically rendered active upon catching a sheaf by the weight thereof to convey said sheaf to the entrance of the shock compartment, and instrumentalities automatically rendered active by the aforesaid instrumentalities at the end of the conveying action, to push the sheaf into the shock compartment.

3. A sheaf shocker, comprising a shock compartment divided into a plurality of sheaf compartments, instrumentalities for catching a sheaf, and being automatically rendered active by the weight of the sheaf to convey the sheaf to the entrance of the shock compartment; and instrumentalities rendered operative during each sheaf conveying action of the aforesaid instrumentalities, to push successive sheaves first in one sheaf compartment and then in the other, alternately.

4. A sheaf shocker, including cradle supporting means, a sheaf catching cradle shiftably mounted in a normal catching position on said means, and normally open sheaf gripping means embodied in the cradle, automatically rendered operative to grip the sheaf when the cradle is shifted on its supporting means by virtue of the weight of the sheaf.

5. A sheaf shocker, including cradle supporting means, a sheaf catching cradle shiftably mounted in a predetermined catching position on said means, sheaf gripping means embodied in said cradle, with limited movement in respect thereto; and connecting means between a portion of the gripping means and an adjacent fixed support, causing the gripping action of said gripping means upon application of the weight of a sheaf and the consequent shifting of the cradle on its supporting means out of the predetermined normal position.

6. A sheaf shocker, including cradle supporting means, a sheaf catching cradle shiftably mounted on said sheaf and comprising a tubular member with arms; sheaf gripping means movably mounted in said tubular member, including grippers and a crank arm; and limiting means connecting the crank arm with a fixture, causing the operation of said grippers against the sheaf when the cradle is shifted on its supporting means by the weight of the sheaf.

7. A sheaf catching cradle, comprising a pivotally supported sleeve with stop recesses in the extremities, arms fixed to the sleeve, a rod in the sleeve, with an exposed crank end, and grippers connected to the rod movable in the stop recesses; and limiting means connecting the crank end to a fixed support, causing the movement of the grippers to the sheaf gripping position when the cradle is shifted in position by the weight of a sheaf so that the rod is made to turn in respect to the sleeve.

8. The combination in a sheaf shocker, of a depressible sheaf chute, and means for catching the sheaf after it rolls across the chute, including instrumentalities rendered operative upon the depression of the chute to convey the sheaf into a shock forming position.

9. The combination in a sheaf shocker, of a chute depressible by a sheaf rolling across, catching mechanism in position to catch the sheaf, and means rendered operative upon the depression of the chute to move the catching means and convey the sheaf into a shock forming position.

10. In a sheaf shocker, means for catching a sheaf, a chute over which the sheaf passes, and means operated by the chute through the weight of the sheaf in moving toward the catching means, for setting said catching means in motion and transfer the sheaf to a vertical position.

11. Sheaf catching means normally in a substantially horizontal position to catch a sheaf, instrumentalities embodied in said catching means and actuated by a predetermined shifting movement thereof by the weight of the sheaf to grip the sheaf, operatively associated means normally inactive but adapted to move the catching means and transfer the sheaf into a vertical position, simultaneously releasing the sheaf by said gripping means; and means operated by the sheaf in moving toward the catching means for rendering said driving connection active.

12. A continuously movable driving member, a normally disconnected and inactive driven member, sheaf catching means operatively associated with said driven member and occupying a substantially horizontal position, a chute depressible by the sheaf in moving toward the catching means, and a connection between said chute and driven member for shifting said driven member into engagement with the driving member to cause the erection of the catching means and sheaf.

13. A continuously movable driving member, an associated normally disconnected and inactive driven member, substantially normally horizontal sheaf catching means operatively associated with said driven member, means actuated by the sheaf in moving to the catching means for connecting the driving member to the driven member, which latter moves the catching means to the sheaf erecting position and back to normal; and means operatively associated with the driven member for automatically disconnecting it from the driving member after having erected the sheaf and returned the catching means.

14. A continuously movable driving member, an associated normally disconnected driven member movably mounted, sheaf actuated means for moving said driven member into engagement with the driving member, means for holding said driven member in said engagement, means for catching said sheaf and transferring it to a vertical shock forming position by virtue of operating connections to said driven member, and means embodied in said driven member for automatically releasing said holding means after a predetermined movement of said driven member.

15. A continuously movable driving member, an operatively associated driven member normally disconnected and idle, slidable bearing means for the driven member, sheaf operated means for sliding the bearing means and moving the driven member into operative engagement with the driving member, means coöperating with said sliding bearing for holding the driven member in such engagement, means embodied in said driven member for automatically raising said holding means at a predetermined time, and means for subsequently returning said bearing means to normal position.

16. A continuously movable driving member, a normally disconnected driven member, slidable bearing means for a portion of the driven member, movably mounted sheaf-operated shifting means for said bearing means and driven member, and means operatively associated with said bearing means for moving the driven member in engagement with the driving member upon actuation of said shifting means, for a predetermined length of time.

17. The combination in a sheaf shocker, of a driven gear shiftable into an operative position, a slidable box supporting the shaft of said gear, associated means becoming active to temporarily hold said gear in said operative position when shifted, and means carried by the gear for automatically actuating said holding means to a releasing position at a predetermined time.

18. The combination in a sheaf shocker, of a driven gear shiftable to an operative position, bearing structure supporting the shaft of said gear, operatively associated rockable means for shifting the bearing structure and gear when actuated by a sheaf, means becoming active to temporarily hold the bearing structure and gear in the operative position when shifted, means carried by the gear for displacing the holding means at a predetermined time, and means operatively associated with said rockable means for reversely moving the bearing structure and gear to the original position.

19. The combination in a sheaf shocker, of a continuously rotatable driver, a normally disengaged driven gear, sheaf-actuated shifting means operatively associated with the driven gear for shifting it into engagement with the driver, including a sliding bearing structure with a slide plate having a lock recess; means for engaging said recess to temporarily hold the driven gear in driving engagement, and means carried by said gear for displacing said holding means after a predetermined amount of revolution of the driven gear.

20. The combination, of a continuously rotatable driver, a normally disengaged driven gear at one side, a normally disengaged gear at the other side, grain sheaf-actuated instrumentalities for shifting the first gear into operative engagement with the driver, and means actuated by and rendered operative during the rotation of the first gear, to shift the second gear into engagement with the driver.

21. The combination, of a continuously rotating driver, a normally disconnected driven gear at one side provided with a trip arm, a normally disconnected driven gear at the other side, sheaf-actuated means for shifting the first gear into connection with the driver, and operatively associated means including connections to the second gear, engageable by the trip arm to shift the second gear into connection with the driver after a predetermined rotation of the first gear.

22. The combination, of a continuously rotating driver, a normally disengaged erecting gear at one side, a normally disengaged switching gear at the other side, shifting means operatively associated with the switching gear, sheaf operated means for initially moving the erecting gear into engagement with the driver, a trip arm operatively associated with the erecting gear for actuating said shifting means and subsequently shifting the switching gear into engagement with the driver, and means embodied in the trip arm, enabling adjustment to change the time of actuation of said shifting means.

23. The combination, of a continuously rotating driver, a normally disengaged switching gear, a shifting box providing a bearing for one end of the shaft on which the gear is mounted, with means for normally holding the switching gear in disengaged position; shifting means including connections to said box arranged to be shifted at a predetermined time to shift the switching gear into engagement, and means operatively associated with the switching gear shaft for automatically holding said gear in such engagement for a predetermined time.

24. The combination, of a switching gear shaft with a switching gear arranged to be shifted into a driving position, means operatively associated with the switching shaft and rendered active to hold the gear in the driving position when shifted for a predetermined time, and resilient means operatively associated with the shaft for returning the gear to the normal position after such predetermined time.

25. A continuously rotatable driver, a normally disengaged switching gear including a switching shaft on which the gear is mounted, movable into engagement with the driver; and means carried by the switching shaft to operatively engage an adjacent fixed member, to hold the switching gear in driving engagement for a predetermined time.

26. A continuously rotatable driver, a normally disengaged switching gear including a switching shaft on which the gear is mounted, movable into engagement with the driver, means carried by the switching shaft to operatively engage an adjacent fixed member, to hold the switching gear in driving engagement for a predetermined time, and means for automatically withdrawing said switching gear at such time.

27. A switching gear including a switching shaft on which the gear is mounted, shiftable to a driving position; means carried by the shaft for operatively engaging an adjacent fixture to temporarily hold the gear in said position, including a flanged shifting holder with a plurality of openings arranged to admit said fixture; and means operatively associated with said shaft for withdrawing the gear when another of said openings arrives at said fixture.

28. A normally inactive switching gear arranged to be shifted to a driving position, a switching gear shaft, a shifting box with a movable bearing for the shaft, means operatively associated with the box to keep the gear in normal position, means for limiting the movement of the box in two directions, holding means carried by the shaft including a shifting holder having flanges with openings and engageable means for said holding means, including a holder stud movable into one opening when the gear is shifted, thereafter maintaining the holding position until another opening is arrived at.

29. The combination, of a shiftable switching shaft, a relatively fixed holder stud toward which the shaft is shiftable, a shifting holder on the shaft including a flange with a plurality of openings enabling ingress and egress of the stud into the passage between the flange and shaft; and means embodied in the holder enabling adjustment.

30. A switching gear shiftable into a driving position, a switching shaft on which the gear is mounted, a shifting box with associated means for limiting the movement in two directions, means operatively associated with the box, including a trip arm engaged member for shifting the box in one direction when so engaged, instrumentalities operatively associated with the shaft for holding the gear in the shifted position including a shifting holder with a flange having openings providing a channel, and a member arranged to enter one opening and occupy the channel until another opening moves around; and resilient means connected to the box for shifting it in the other direction when said opening comes around.

31. A sheaf shocker, comprising means for catching a sheaf, a continuously rotating driver, a normally disengaged erecting gear at one side, with operatively associated instrumentalities set in motion by the sheaf for shifting the erecting gear into engagement with the driver and thereby moving the catcher and sheaf to an erect shock-forming position; and a normally disengaged switching gear at the other side, shifted into engagement with the driver by a part of the erecting gear after predetermined movement, including instrumentalities thereby set in motion for switching the sheaf into a shock compartment.

32. A sheaf shocker, comprising mechanism for switching a sheaf into an adjacent shock compartment, means for initially catching a sheaf, a continuously rotatable driver, a normally disengaged erecting gear with actuating connections to the catching means, including associated means actuated by the sheaf in moving to the catching position, thereby shifting the erecting gear in driving engagement to transfer the sheaf to the switching mechanism, and a normally disengaged switching gear with means actuated by associated mechanism of the erecting gear for shifting said gear into driving engagement, including means operatively connected to the switching mechanism for switching the sheaf.

33. A sheaf shocker, including intermittently oscillating switching mechanism for switching sheaves into sheaf compartments, normally dormant means for catching a sheaf and subsequently transferring it to the switching position, instrumentalities rendered active by the sheaf in moving to the catching position to actuate said catching means, and instrumentalities rendered operative by and during the activity of the associated instrumentalities of the catching means, for switching the sheaf, as described.

34. A sheaf shocker, comprising a sheaf catcher movable to transfer the sheaf into position to be switched into a shock compartment, a continuously rotatable driver, an erecting gear with operating connections to the catcher, shifting means actuated by the sheaf to shift said gear into engagement with the driver thereby moving the catcher and the sheaf to the erecting position, a normally disengaged switching gear, means actuated by a portion of the erecting gear connection to shift the switching gear after a predetermined movement of the erecting gear, a switching sprocket with an operatively connected switching pinion including a packer shaft and switch rod for switching said sheaf, and means for imparting an oscillating motion to the switching sprocket by the rotation of said switching gear, including a switching shaft on which the switching gear is mounted, with a switching crank and pitman.

35. Switching mechanism for sheaf shockers, comprising an oscillatable shaft with rods for alternately switching sheaves into adjacent side compartments, operating connections to said shaft including an intermittently oscillatable member, a switching shaft arranged to be shifted into position for partial rotation at predetermined times, including operating connections to said oscillatable member, and means operatively combined with the switching shaft for holding it in said shifted position for partial rotation, thereafter permitting countershifting to stop the shaft.

36. Switching mechanism for a sheaf shocker, comprising a packer shaft with switch rods for pushing a sheaf into a shock compartment, oscillatable driving connections for the packer shaft including a switching sprocket, and a switching shaft arranged to make predetermined portions of a revolution, with crank and pitman connections to said sprocket for imparting oscillatory movement thereto, in accordance with said partial revolution.

37. Switching mechanism for sheaf shockers, comprising a packer shaft with switch rods and a switching pinion, a switching sprocket with driving connection to the pinion and having a switching arm, and a switching shaft arranged to be intermittently partially revolved, including crank and pitman connections to said switching arm, to convert said partial revolution to oscillation at the switching sprocket.

38. A switching sprocket arranged to be intermittently oscillated, a switching shaft arranged to be shifted and having driving connection for intermittent partial revolution at predetermined times, including a switching crank with a pin; and a switching pitman joining the sprocket and crank, with a slotted end to receive the pin and provide a loose connection.

39. Switching mechanism for sheaf shockers comprising a packer shaft with switch rods and a switching pinion oscillatable in one plane, a switching sprocket with driving connections to the pinion oscillatable in the same plane, and an intermittently operable gripping shaft with a switching crank rotatable in a plane at right angles, including a switching pitman for converting the partial rotation of the switching shaft to oscillation at the switching sprocket.

40. Switching mechanism for sheaf shockers, including a vertically journaled and oscillatable packer shaft, and a plurality of switch rods carried by the shaft for pushing sheaves into adjacent compartments, including clamping means by which the rods are secured and may be adjusted on the shaft.

41. Sheaf catching and erecting mechanism for sheaf shockers, comprising a suitably journaled carrier shaft with a carrier crank at one end and an erecting arm at the other, a sheaf catcher operatively mounted on the carrier crank, including means for automatically gripping a sheaf when actuated by the weight thereof, a continuously rotatable driver, an erecting gear normally disengaged, and including an erecting crank with a pitman extending to the erecting arm, and means for shifting the erecting gear into engagement with the driver, including a rockably mounted shifting bell crank with connected means actuated by the sheaf in moving to the catcher.

42. Sheaf catching and erecting means for sheaf shockers, comprising a sheaf catching cradle, with a supporting carrier shaft, an erecting arm having a pin; and normally idle carrier erecting mechanism, rendered active by a sheaf and including a laterally shiftable erecting gear with a pitman extending to the erecting arm, said pitman having a slot to receive the aforesaid pin and allow for the lateral shifting of the erecting gear.

43. A sheaf shocker, comprising means for containing the shock, said means including bottom gates, an end gate structure, means for pressing the shock together and down, means for pushing the shock rearwardly and out, and operatively associated instrumentalities for actuating all of said means simultaneously to dispose of the shock.

44. A sheaf shocker, comprising shock carrying and discharging means, said means including bottom gates, a movable end shock retaining structure, means for pressing the shocker together and down, means for pushing the shock rearwardly and out, and instrumentalities actuated manually, for operating all of the foregoing elements substantially simultaneously.

45. A sheaf shocker, including a shock compartment with parallel rails and a superstructure rising from the rails, a partition plate pendent from the superstructure to divide the shock compartment, bottom gates for the shock compartment, gate supporting means extending around the side rails and including means for rockably mounting the supporting means on the superstructure, means operatively connected with said supporting means for pressing the shock toward the partition and downwardly, and means for actuating said mounting means, thereby simultaneously lowering the gates and pressing the shocks down.

46. The combination of a side channel rail with a carried superstructure, a bottom gate including supporting means extending around the channel rail, a rockable mounting for said supporting means operatively associated with the superstructure, and means mounted on the superstructure including connections to portions of said supporting means, for pressing a shock downwardly when the rockable mounting means is actuated to lower the bottom gate.

47. A shock compartment including a rail with a superstructure including bower standards attached to the rail, a bottom gate below the rail, including supporting means extending around the rail into proximity with the bower standards; rockable mounting means including a gate shaft carrying said supporting means, and including suitable bearing means for supporting the shaft on said standards; means for pressing the shock downwardly, including a longitudinal member pivotally supported on said standard, and means connecting said pressing means to a portion of the gate supporting means, whereby the pressing means and bottom gate are actuated together when the rockable means is moved.

48. Instrumentalities in a sheaf shocker for discharging a shock, comprising downwardly movable supporting gates, separate shock pressing means, and connecting means between the two actuating both simultaneously when the bottom gates are moved.

49. The combination, of means for pressing a shock downwardly, means for normally retaining the shock at the rear end, and operatively associated means for actuating the latter from said pressing means.

50. The combination, of movable means for pressing a shock downwardly, means for normally retaining the shock at the rear end and connecting means for simultaneously displacing the retaining means upon movement of said pressing means.

51. The combination, of shock pressing means downwardly movable in one plane, shock retaining means, and connecting means for simultaneously displacing the retaining means in another plane upon movement of said pressing means.

52. The combination, of shock pressing means downwardly movable in one direction, shock end retaining means normally in operative position but movable in a direction at right angles to that of the pressing means, and means joining the retaining means to the pressing means so that both operate simultaneously, including a loose connection for accommodating the relatively different directions of movement.

53. A shock compartment for sheaf shockers, including a bower structure; shock retaining means disposed across the end of the compartment, shock pressing means movable downwardly and disposed lengthwise of the compartment, and connecting means between the two for simultaneously displacing the retaining means as the pressing means is moved downwardly.

54. A shock compartment including a bower structure, shock retaining means pendently and movably mounted across the end of said compartment, shock pressing means disposed longitudinally and close to one side of the bower structure, including means pivotally mounted on the bower structure enabling the downward movement of the pressing means; and means joining the pressing means to the retaining means so that both operate simultaneously, including a loose connection between the two to compensate for differences in direction of movement.

55. A shock compartment including a bower structure, end shock retaining means including a grid shaft operatively mounted across the end of the shock compartment, and including pendent members, means for pressing the shock downwardly, including a longitudinally extending presser bar to the bower structure on the inside, and presser arms pivotally mounted on said bower structure; a raising arm on the grid shaft, and a raising link connecting a presser arm with the raising arm to simultaneously raise said retaining means as the presser bar is moved downwardly.

56. Instrumentalities for containing and discharging a shock, comprising a shock compartment including side rails and a superstructure, bottom gates disposed longitudinally of the compartment, shock pressing means disposed longitudinally of the compartment, shock retaining means disposed transversely of the compartment, means for pushing the shock rearwardly operatively mounted at the entrance to the compartment, manually actuated means disposed transversely of the compartment, and inter-connected means for operating the aforesaid shock handling mechanism substantially at one time by moving said manually actuated means.

57. The combination, of longitudinally extending parallel bottom gates, including rockable means on which they are mounted; a rockable dump shaft with actuating means running to the operator, including operating connections to the rockable means for rocking them in opposite directions.

58. The combination, of a pair of bottom gates, including rockable means by which they are supported; movable means disposed at right angles to said rockable means, and suitable connections therebetween for moving said rockable means in opposite directions upon partially moving said means at right angles in another direction.

59. The combination, of shock supporting bottom gates with operating mechanism therefor, normally inactive means for pushing the shock rearwardly, and instrumentalities rendered active to move the shock pushers shortly after the beginning of operation of the gate operating means.

60. The combination, of shock supporting bottom gates with operating mechanism therefor, means operatively associated with said gates for pushing the shock rearwardly, a continuously movable driving member, and instrumentalities operatively associated with said driving member, rendered active to move said shock pushers shortly after the operation of said bottom gate by said operating mechanism.

61. The combination, of bottom gate operating mechanism, a normally inactive shock pusher, normally inactive pusher operating mechanism, a continuously movable driving member, and means actuated after a predetermined movement of said gate operating mechanism for setting said shock pusher in motion by said continuously moving driving member.

62. The combination, of bottom gate operating mechanism, a normally inactive shock pusher, normally inactive pusher operating mechanism, a continuously movable driving member, means actuated after a predetermined movement of said gate operating mechanism for setting said shock pusher in motion by said continuously moving driving member, and means embodied in said pusher operating mechanism for automatically rendering it inoperative after a predetermined movement.

63. The combination, of mechanism for actuating the bottom gates, shock pusher mechanism operatively associated with the gates, normally inactive means whereby the shock pushers are actuated, a continuously moving member operatively associated with said inactive means, and means under control of the gate actuating mechanism arranged to establish a driving connection in said movable member and said inactive means, to render said means active for a predetermined time.

64. The combination, of a continuously movable member including means whereby said member is moved by contact with the ground, mechanism by which bottom gates are actuated, shock pushers with operatively associated mechanism by which they are actuated, and means operatively connected between said shock pusher mechanism, and gate actuating mechanism for operatively connecting the pusher actuating mechanism with said movable member for a predetermined time.

65. The combination, of a normally inactive mechanism for actuating a shock pusher, an operatively associated continuously moving normally disengaged driving member, and associated controlling means permitting movement of said driving member into driving engagement with said pusher actuating means, when operated.

66. The combination, of normally inactive means for actuating a shock pusher, a continuously moving normally disconnected driving member operatively associated with said means, means for urging said driving member into driving engagement with said means, and means normally holding said driving member out of driving engagement in opposition to said urging means but enabling such driving engagement upon operation thereof.

67. The combination, of means for actuating a shock pusher, a driving member for said actuating means, including means urging the driving member into driving engagement with said actuating means; and means under control of said actuating means for automatically throwing and keeping said driving member out of driving engagement.

68. The combination, of shock pusher actuating means, normally inactive but capable of predetermined movement; a normally disconnected continuously movable driving member including means for urging it in driving position with said actuating means; and operatively associated means rendered active to move the driving member out of driving position at a predetermined place in the movement of said actuating means and automatically holding said driving member in such position.

69. The combination, of a continuously moving driving member, means for actuating a shock pusher, operatively connected with the driving member whereby the shock pusher means is moved; and operatively associated means engageable by the moving pusher actuating means at a predetermined point, to automatically disconnect the driving member.

70. The combination, of a moving shock pusher actuating means, an operatively connected continuously moving driving member whereby said actuating means is moved, and interposed means engageable by said actuating means at a predetermined point in its movement, to automatically wedge out said driving member.

71. A moving shock pusher actuating means, including an engageable clutch member; a continuously moving driving member with a clutch element in engagement with the first clutch element, whereby the actuating means is moved; and interposed means engageable by said actuating means at a certain point during its movement, to automatically disconnect said clutch element and stop the actuating means while the driving member continues moving.

72. A moving shock pusher actuating crank, a continuously moving driving member in driving engagement with the crank whereby the crank is moved, and an interposed rockable member, engaged by the crank at a certain point in its movement to automatically force the driving member aside and break the driving connection.

73. The combination, of a shock pusher actuating crank capable of intermittent movement, an operatively engageable continuously moving driving member causing such crank movement when in driving engagement, and a rockably mounted interposed shifting member, engageable by the crank at a certain point in its movement to automatically force the driving member aside and out of said driving engagement, whereby the crank stops.

74. A normally inactive shock pusher actuating crank including a clutch element, an operatively associated continuously moving driving member with a corresponding clutch element normally in disengagement, means for urging the driving member into operative engagement with the crank, and an interposed clutch yoke keeping the driving member out of engagement, including means for bodily shifting the clutch yoke to permit a driving engagement, said yoke including an abutment engageable by the crank at a certain point in its movement to automatically disconnect the driving member, said abutment and yoke keeping the crank and driving member separated until the yoke is again bodily moved.

75. An inactive shock pusher actuating crank in a predetermined normal position, clutch elements adjacent to the crank, an operatively associated continuously moving driving member with a corresponding clutch element normally out of driving engagement, means for urging the driving member into driving engagement, a yoke interposed between the driving member and crank, with an abutment engaging the crank to keep the driving member pressed to one side; and a shiftable mounting for the yoke enabling the abutment to be moved out of engagement with the crank whereby the clutch elements engage to drive the crank, said crank reëngaging the abutment after certain movement to rock the yoke and automatically disengage the driving member.

76. The combination, of a pusher shaft with a pusher actuating crank, a clutch element fixed on the shaft, a clutch sprocket with a hub loosely and continuously movable on an adjacent part of the shaft, a corresponding clutch element carried by the sprocket, resilient means encircling the hub and urging the sprocket toward the crank, and an interposed clutch yoke engaging the sprocket with an abutment engaging the crank, whereby the sprocket is normally pressed to one side by wedge action, said yoke being bodily shiftable to disengage said abutment from the crank to permit the engagement of the clutch elements and the consequent movement of the crank.

77. The combination, of a normally inactive shock pusher actuating crank in one position, a normally disengaged continuously rotating driving member revolving in one direction, and interposed wedge means normally keeping the crank and driving member separated, but movable in a direction opposite to that of the driving member, to enable a driving engagement of said member and crank whereby the crank is moved in a direction corresponding to that of the driving member.

78. The combination, of a dump shaft with an arm having a pin, a pivotally mounted yoke arm with a slotted end link receiving the pin, and a clutch yoke rockably mounted on the yoke arm, capable of shifting movement independently of its rockable mounting, after the pin arrives at the extremity of the slotted end of the link upon a partial rotation of said dump shaft.

JACOB P. HIEBERT.